US012812581B2

(12) United States Patent
Yang et al.

(10) Patent No.: US 12,812,581 B2
(45) Date of Patent: Nov. 24, 2026

(54) PROPAGATION DELAY COMPENSATION ENHANCEMENT

(71) Applicant: QUALCOMM Incorporated, San Diego, CA (US)

(72) Inventors: Luanxia Yang, Beijing (CN); Jing Sun, San Diego, CA (US); Changlong Xu, Beijing (CN); Rajat Prakash, San Diego, CA (US); Xiaoxia Zhang, San Diego, CA (US); Sherif Elazzouni, San Diego, CA (US); Ozcan Ozturk, San Diego, CA (US); Shaozhen Guo, Beijing (CN); Siyi Chen, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 252 days.

(21) Appl. No.: 18/694,270

(22) PCT Filed: Nov. 23, 2021

(86) PCT No.: PCT/CN2021/132288

§ 371 (c)(1),
(2) Date: Mar. 21, 2024

(87) PCT Pub. No.: WO2023/092252

PCT Pub. Date: Jun. 1, 2023

(65) Prior Publication Data

US 2024/0406902 A1 Dec. 5, 2024

(51) Int. Cl.
*H04W 56/00* (2009.01)
*H04W 24/10* (2009.01)

(52) U.S. Cl.
CPC ....... *H04W 56/0065* (2013.01); *H04W 24/10* (2013.01); *H04W 56/005* (2013.01)

(58) Field of Classification Search
CPC H04W 56/0065; H04W 24/10; H04W 56/005
See application file for complete search history.

(56) References Cited

U.S. PATENT DOCUMENTS

2020/0322908 A1 10/2020 Prakash et al.
2021/0329580 A1 10/2021 Kim et al.
(Continued)

FOREIGN PATENT DOCUMENTS

WO WO-2021066730 A1 4/2021
WO WO-2021066732 A1 4/2021
(Continued)

OTHER PUBLICATIONS

3GPP: "Foreword", 3GPP Draft, Draft_38133-H10, 3rd Generation Partnership Project, Mobile Competence Centre, 650, Route Des Lucioles, F-06921 Sophia-Antipolis Cedex, France, 3GPP TS 38.133 V17.1.0, Mar. 29, 2021, XP052279088, 415 pages, paragraph 9.9.4, paragraphs 9.9.4.1-9.9.4.5.
(Continued)

*Primary Examiner* — Derrick V Rose
(74) *Attorney, Agent, or Firm* — Holland & Hart LLP

(57) ABSTRACT

Methods, systems, and devices for wireless communications are described. In some wireless communications systems, a user equipment (UE) may receive an indication of a configuration for transmitting a propagation delay compensation (PDC) report and a reference signal resource for performing one or more round trip timing (RTT) measurements associated with the PDC report. The UE may receive control signaling from the base station which includes a request for the UE to transmit the PDC report which includes the one or more RTT measurements. The UE may transmit the PDC report based on receiving the request from the base station, and the UE may perform one or more PDC procedures based on transmitting the PDC report. In some other examples, the base station may transmit a request to a higher layer to
(Continued)

obtain the RTT measurements, and may relay the RTT measurements to the UE for performing the PDC procedures.

25 Claims, 22 Drawing Sheets

(56) References Cited

U.S. PATENT DOCUMENTS

| | | | | |
|---|---|---|---|---|
| 2022/0060921 | A1* | 2/2022 | Sadeghi | H04W 24/10 |
| 2022/0264551 | A1* | 8/2022 | Bao | H04W 72/20 |
| 2023/0254872 | A1* | 8/2023 | Kwak | H04L 1/1887 370/329 |
| 2023/0388953 | A1* | 11/2023 | Zou | H04W 24/10 |
| 2024/0057004 | A1* | 2/2024 | Ashraf | H04W 56/0045 |

FOREIGN PATENT DOCUMENTS

| | | | |
|---|---|---|---|
| WO | WO-2021208082 | A1 | 10/2021 |
| WO | WO-2021225511 | A1 | 11/2021 |

OTHER PUBLICATIONS

Supplementary European Search Report—EP21964996—Search Authority—The Hague—Jun. 26, 2025.

International Search Report and Written Opinion—PCT/CN2021/132288—ISA/EPO—Aug. 25, 2022.

* cited by examiner

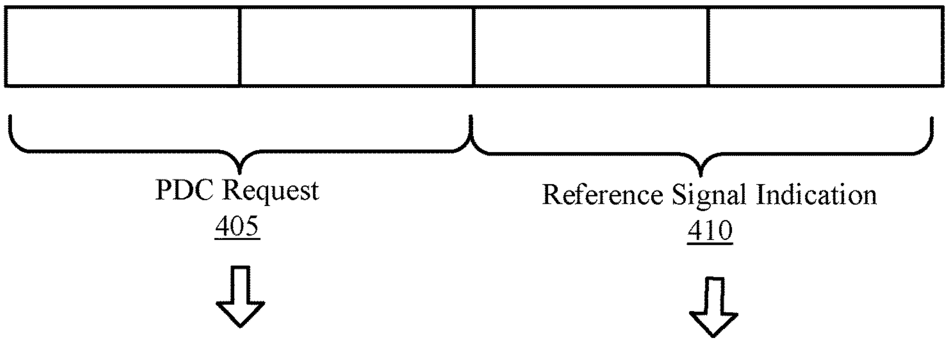

| | |
|---|---|
| 00 | No PDC report request |
| 01 | PRS used for PDC report |
| 10 | CSI-RS used for PDC report |
| 11 | Reserved |

| | |
|---|---|
| 00 | RS in BWP_0 for PDC |
| 01 | RS in BWP_1 for PDC |
| 10 | RS in BWP_2 for PDC |
| 11 | RS in BWP_3 for PDC |

400-a

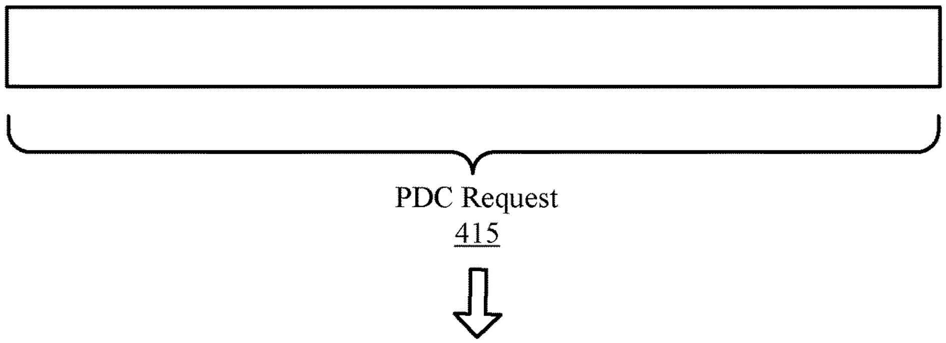

| | | | | | |
|---|---|---|---|---|---|
| 0000 | No PDC report request | 0100 | PRS in highest BWP for PDC report | 0100 | CSI-RS in highest BWP for PDC report |
| 0001 | PRS in lowest BWP for PDC report | 0101 | CSI-RS in lowest BWP for PDC report | 1001–1111: Reserved | |
| 0010 | PRS in second lowest BWP for PDC report | 0110 | CSI-RS in second lowest BWP for PDC report | | |
| 0011 | PRS in second highest BWP for PDC report | 0111 | CSI-RS in second highest BWP for PDC report | | |

400-b

FIG. 4

PROPAGATION DELAY COMPENSATION ENHANCEMENT

CROSS REFERENCE

The present Application is a 371 national stage filing of International PCT Application No. PCT/CN2021/132288 by YANG et al. entitled "PROPAGATION DELAY COMPENSATION ENHANCEMENT," filed Nov. 23, 2021, which is assigned to the assignee hereof, and which is expressly incorporated by reference in its entirety herein.

FIELD OF TECHNOLOGY

The following relates to wireless communications, including propagation delay compensation enhancement.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications signaling between devices in a wireless communications network may be subject to propagation delays that introduce uncertainty and increased latency. In some cases, devices may compensate for such propagation delays using a number of different propagation delay compensation (PDC) procedures to increase reliability.

SUMMARY

The described techniques relate to improved methods, systems, devices, and apparatuses that support propagation delay compensation (PDC) enhancement. Generally, the described techniques provide for compensating for propagation delays in a wireless communications network. In some cases, signaling between wireless communications devices such as user equipment (UE) and base station may be associated with signaling propagation delays, for example, delays between receiving and transmitting communications at a base station and a UE, or other propagation delays based on signal propagation over different medium. To account for such propagation delays, the UE may send PDC reporting to inform the base station of propagation delay measurements. Based on transmitting the PDC report, the UE may implement a PDC procedure which accounts for the propagation delays to improve coordination and overall signaling efficiency in the network.

The UE may receive a PDC reporting configuration or a PDC reporting trigger from a base station along with one or more reference signal resources that the UE may use to perform measurements associated with the propagation delays. The UE may then receive a request from the base station (e.g., in downlink control information (DCI), medium access control-control elements (MAC-CE), a radio resource control (RRC) configuration, or a combination thereof) to transmit the PDC report. In some cases, the UE may receive additional information from the base station, and based on receiving the PDC report request and performing the PDC measurements, the UE may perform one or more PDC procedures to account for the propagation delay.

A method for wireless communication at a UE is described. The method may include receiving, from a base station, an indication of a configuration for transmitting a PDC report and a reference signal resource for performing one or more round trip timing (RTT) measurements associated with the PDC report, receiving, from the base station, control signaling including a request for the UE to transmit the PDC report including the one or more RTT measurements, and transmitting, to the base station, the PDC report in accordance with the request.

An apparatus for wireless communication at a UE is described. The apparatus may include a processor, memory coupled with the processor, and instructions stored in the memory. The instructions may be executable by the processor to cause the apparatus to receive, from a base station, an indication of a configuration for transmitting a PDC report and a reference signal resource for performing one or more RTT measurements associated with the PDC report, receive, from the base station, control signaling including a request for the UE to transmit the PDC report including the one or more RTT measurements, transmit, to the base station, the PDC report in accordance with the request, and perform one or more PDC procedures based on transmitting the PDC report.

Another apparatus for wireless communication at a UE is described. The apparatus may include means for receiving, from a base station, an indication of a configuration for transmitting a PDC report and a reference signal resource for performing one or more RTT measurements associated with the PDC report, means for receiving, from the base station, control signaling including a request for the UE to transmit the PDC report including the one or more RTT measurements, means for transmitting, to the base station, the PDC report in accordance with the request, and means for performing one or more PDC procedures based on transmitting the PDC report.

A non-transitory computer-readable medium storing code for wireless communication at a UE is described. The code may include instructions executable by a processor to receive, from a base station, an indication of a configuration for transmitting a PDC report and a reference signal resource for performing one or more RTT measurements associated with the PDC report, receive, from the base station, control signaling including a request for the UE to transmit the PDC report including the one or more RTT measurements, transmit, to the base station, the PDC report in accordance with the request.

In some examples of the method, apparatuses, and non-transitory computer-readable medium described herein, the control signaling includes DCI indicating an aperiodic reporting configuration for transmitting the PDC report and the method, apparatuses, and non-transitory computer-readable medium may include further operations, features, means, or instructions for transmitting, to the base station, one or more PDC reports in accordance with the aperiodic reporting configuration, and performing one or more PDC procedures based on the one or more RTT measurements.

In some examples of the method, apparatuses, and non-transitory computer-readable medium described herein, the control signaling includes DCI indicating an aperiodic reporting configuration for transmitting the PDC report and the method, apparatuses, and non-transitory computer-readable medium may include further operations, features, means, or instructions for receiving, in a first field of the DCI, a first indication of the request for the UE to transmit the PDC report and receiving, in a second field of the DCI, a second indication of the reference signal resource for performing the one or more RTT measurements associated with the PDC report.

In some examples of the method, apparatuses, and non-transitory computer-readable medium described herein, the reference signal resource indicates a bandwidth part on which the PDC report may be to be transmitted.

In some examples of the method, apparatuses, and non-transitory computer-readable medium described herein, the first field of the DCI and the second field of the DCI each include a separate bitmap for conveying the first indication and the second indication.

In some examples of the method, apparatuses, and non-transitory computer-readable medium described herein, the control signaling includes DCI indicating an aperiodic reporting configuration for transmitting the PDC report and the method, apparatuses, and non-transitory computer-readable medium may include further operations, features, means, or instructions for receiving, in a single field of the DCI, the first indication of the request for the UE to transmit the PDC report and an indication of the reference signal resource for performing the one or more RTT measurements associated with the PDC report.

In some examples of the method, apparatuses, and non-transitory computer-readable medium described herein, the control signaling includes a MAC-CE indicating a semi-persistent reporting configuration for transmitting the PDC report and the method, apparatuses, and non-transitory computer-readable medium may include further operations, features, means, or instructions for transmitting, to the base station, one or more PDC reports in accordance with the semi-persistent reporting configuration, and performing one or more PDC procedures based on the one or more RTT measurements.

In some examples of the method, apparatuses, and non-transitory computer-readable medium described herein, the control signaling includes a MAC-CE indicating a semi-persistent reporting configuration for transmitting the PDC report and the method, apparatuses, and non-transitory computer-readable medium may include further operations, features, means, or instructions for receiving, in a sub-header of the MAC-CE, a first indication of a downlink shared channel associated with an activation or deactivation of the semi-persistent reporting configuration for transmitting the PDC report.

In some examples of the method, apparatuses, and non-transitory computer-readable medium described herein, one or more fields of the sub-header indicate the activation or deactivation of the semi-persistent reporting configuration based on a positioning reference signal for the semi-persistent reporting.

In some examples of the method, apparatuses, and non-transitory computer-readable medium described herein, an additional one or more fields of the sub-header indicate the activation or deactivation of the semi-persistent reporting configuration and further indicate a channel status information reference signal for semi-persistent reporting of the PDC report.

In some examples of the method, apparatuses, and non-transitory computer-readable medium described herein, the control signaling includes DCI indicating a semi-persistent reporting configuration for transmitting the PDC report and the method, apparatuses, and non-transitory computer-readable medium may include further operations, features, means, or instructions for transmitting, to the base station, one or more PDC reports in accordance with the semi-persistent reporting configuration, and performing one or more PDC procedures based on the one or more RTT measurements.

Some examples of the method, apparatuses, and non-transitory computer-readable medium described herein may further include operations, features, means, or instructions for receiving, in a first field of the DCI, a first indication of the request for the UE to transmit the PDC report and receiving, in a second field of the DCI, a second indication of the reference signal resource for performing the one or more RTT measurements associated with the PDC report.

In some examples of the method, apparatuses, and non-transitory computer-readable medium described herein, the DCI may be associated with a radio network temporary identifier indicating the semi-persistent reporting configuration in the DCI.

In some examples of the method, apparatuses, and non-transitory computer-readable medium described herein, one or more bitfield values of the DCI indicate an activation or deactivation of the semi-persistent reporting configuration for transmitting the PDC report.

In some examples of the method, apparatuses, and non-transitory computer-readable medium described herein, the indication of the configuration for transmitting the PDC report includes RRC signaling and the method, apparatuses, and non-transitory computer-readable medium may include further operations, features, means, or instructions for identifying the reference signal resource for performing the one or more RTT measurements based on the RRC signaling, the reference signal resource including a channel state information reference signal or a positioning reference signal.

In some examples of the method, apparatuses, and non-transitory computer-readable medium described herein, the RRC signaling includes respective configurations of both the PDC report and the reference signal resource.

In some examples of the method, apparatuses, and non-transitory computer-readable medium described herein, the RRC signaling includes a single configuration for transmission of the PDC report.

A method for wireless communication at a base station is described. The method may include transmitting, to a UE, an indication of a configuration for transmitting a PDC report and a reference signal resource for performing one or more RTT measurements associated with the PDC report, transmitting, to the UE, control signaling including a request for the UE to transmit the PDC report including the one or more RTT measurements, and receiving, from the UE, the PDC report in accordance with the request.

An apparatus for wireless communication at a base station is described. The apparatus may include a processor, memory coupled with the processor, and instructions stored in the memory. The instructions may be executable by the processor to cause the apparatus to transmit, to a UE, an indication of a configuration for transmitting a PDC report and a reference signal resource for performing one or more RTT measurements associated with the PDC report, transmit, to the UE, control signaling including a request for the UE to transmit the PDC report including the one or more RTT measurements, and receive, from the UE, the PDC report in accordance with the request.

Another apparatus for wireless communication at a base station is described. The apparatus may include means for transmitting, to a UE, an indication of a configuration for transmitting a PDC report and a reference signal resource for performing one or more RTT measurements associated with the PDC report, means for transmitting, to the UE, control signaling including a request for the UE to transmit the PDC report including the one or more RTT measurements, and means for receiving, from the UE, the PDC report in accordance with the request.

A non-transitory computer-readable medium storing code for wireless communication at a base station is described. The code may include instructions executable by a processor to transmit, to a UE, an indication of a configuration for transmitting a PDC report and a reference signal resource for performing one or more RTT measurements associated with the PDC report, transmit, to the UE, control signaling including a request for the UE to transmit the PDC report including the one or more RTT measurements, and receive, from the UE, the PDC report in accordance with the request.

In some examples of the method, apparatuses, and non-transitory computer-readable medium described herein, the control signaling includes DCI indicating an aperiodic reporting configuration for transmitting the PDC report and the method, apparatuses, and non-transitory computer-readable medium may include further operations, features, means, or instructions for receiving, from the UE, one or more PDC reports in accordance with the aperiodic reporting configuration.

In some examples of the method, apparatuses, and non-transitory computer-readable medium described herein, the control signaling includes DCI indicating an aperiodic reporting configuration for transmitting the PDC report and the method, apparatuses, and non-transitory computer-readable medium may include further operations, features, means, or instructions for transmitting, in a first field of the DCI, a first indication of the request for the UE to transmit the PDC report and transmitting, in a second field of the DCI, a second indication of the reference signal resource for performing the one or more RTT measurements associated with the PDC report.

In some examples of the method, apparatuses, and non-transitory computer-readable medium described herein, the reference signal resource indicates a bandwidth part on which the PDC report may be to be transmitted.

In some examples of the method, apparatuses, and non-transitory computer-readable medium described herein, the first field of the DCI and the second field of the DCI each include a separate bitmap for conveying the first indication and the second indication.

In some examples of the method, apparatuses, and non-transitory computer-readable medium described herein, the control signaling includes DCI indicating an aperiodic reporting configuration for transmitting the PDC report and the method, apparatuses, and non-transitory computer-readable medium may include further operations, features, means, or instructions for transmitting, in a single field of the DCI, the first indication of the request for the UE to transmit the PDC report and an indication of the reference signal resource for performing the one or more RTT measurements associated with the PDC report.

In some examples of the method, apparatuses, and non-transitory computer-readable medium described herein, the control signaling includes a MAC-CE indicating a semi-persistent reporting configuration for transmitting the PDC report and the method, apparatuses, and non-transitory computer-readable medium may include further operations, features, means, or instructions for receiving, from the UE, one or more PDC reports in accordance with the semi-persistent reporting configuration.

In some examples of the method, apparatuses, and non-transitory computer-readable medium described herein, the control signaling includes a MAC-CE indicating a semi-persistent reporting configuration for transmitting the PDC report and the method, apparatuses, and non-transitory computer-readable medium may include further operations, features, means, or instructions for transmitting, in a sub-header of the MAC-CE, a first indication of a downlink shared channel associated with an activation or deactivation of the semi-persistent reporting configuration for transmitting the PDC report.

In some examples of the method, apparatuses, and non-transitory computer-readable medium described herein, one or more fields of the sub-header indicate the activation or deactivation of the semi-persistent reporting configuration based on a positioning reference signal for the semi-persistent reporting.

In some examples of the method, apparatuses, and non-transitory computer-readable medium described herein, an additional one or more fields of the sub-header indicate the activation or deactivation of the semi-persistent reporting configuration and further indicate a channel status information reference signal for semi-persistent reporting of the PDC report.

In some examples of the method, apparatuses, and non-transitory computer-readable medium described herein, the control signaling includes DCI indicating a semi-persistent reporting configuration for transmitting the PDC report and the method, apparatuses, and non-transitory computer-readable medium may include further operations, features, means, or instructions for receiving, from the UE, one or more PDC reports in accordance with the semi-persistent reporting configuration.

In some examples of the method, apparatuses, and non-transitory computer-readable medium described herein, the DCI may be associated with a radio network temporary identifier indicating the semi-persistent reporting configuration in the DCI.

In some examples of the method, apparatuses, and non-transitory computer-readable medium described herein, one or more bitfield values of the DCI indicate an activation or deactivation of the semi-persistent reporting configuration for transmitting the PDC report.

In some examples of the method, apparatuses, and non-transitory computer-readable medium described herein, the indication of the configuration for transmitting the PDC report includes RRC signaling and the method, apparatuses, and non-transitory computer-readable medium may include further operations, features, means, or instructions for identifying the reference signal resource for performing the one or more RTT measurements based on the RRC signaling, the reference signal resource including a channel state information reference signal or a positioning reference signal.

In some examples of the method, apparatuses, and non-transitory computer-readable medium described herein, the RRC signaling includes respective configurations of both the PDC report and the reference signal resource.

In some examples of the method, apparatuses, and non-transitory computer-readable medium described herein, the RRC signaling includes a single configuration for transmission of the PDC report.

A method for wireless communication at a base station is described. The method may include transmitting, to a location management function, a request for RTT information associated with communications between the base station and a UE, transmitting, to the UE, a reference signal configuration for performing a PDC procedure associated with the RTT information, receiving, from the location management function, the RTT information including one or more RTT measurements in accordance with the transmitted request, and transmitting, to the UE, PDC information based on the one or more RTT measurements.

An apparatus for wireless communication at a base station is described. The apparatus may include a processor, memory coupled with the processor, and instructions stored in the memory. The instructions may be executable by the processor to cause the apparatus to transmit, to a location management function, a request for RTT information associated with communications between the base station and a UE, transmit, to the UE, a reference signal configuration for performing a PDC procedure associated with the RTT information, receive, from the location management function, the RTT information including one or more RTT measurements in accordance with the transmitted request, and transmit, to the UE, PDC information based on the one or more RTT measurements.

Another apparatus for wireless communication at a base station is described. The apparatus may include means for transmitting, to a location management function, a request for RTT information associated with communications between the base station and a UE, means for transmitting, to the UE, a reference signal configuration for performing a PDC procedure associated with the RTT information, means for receiving, from the location management function, the RTT information including one or more RTT measurements in accordance with the transmitted request, and means for transmitting, to the UE, PDC information based on the one or more RTT measurements.

A non-transitory computer-readable medium storing code for wireless communication at a base station is described. The code may include instructions executable by a processor to transmit, to a location management function, a request for RTT information associated with communications between the base station and a UE, transmit, to the UE, a reference signal configuration for performing a PDC procedure associated with the RTT information, receive, from the location management function, the RTT information including one or more RTT measurements in accordance with the transmitted request, and transmit, to the UE, PDC information based on the one or more RTT measurements.

In some examples of the method, apparatuses, and non-transitory computer-readable medium described herein, the reference signal configuration for performing the PDC procedure includes a positioning reference signal configuration, a sounding reference signal configuration, or both.

Some examples of the method, apparatuses, and non-transitory computer-readable medium described herein may further include operations, features, means, or instructions for performing one or more pre-compensation procedures for the UE based on the RTT information.

Some examples of the method, apparatuses, and non-transitory computer-readable medium described herein may further include operations, features, means, or instructions for performing, with the location management function and the UE, one or more RTT positioning procedures using position reference signaling, sounding reference signaling, or both, based on transmitting the request for the RTT information.

BRIEF DESCRIPTION OF THE DRAWINGS

FIGS. 4 and 5 illustrates example control field configurations that support PDC enhancement in accordance with aspects of the present disclosure.

DETAILED DESCRIPTION

Figure 1:
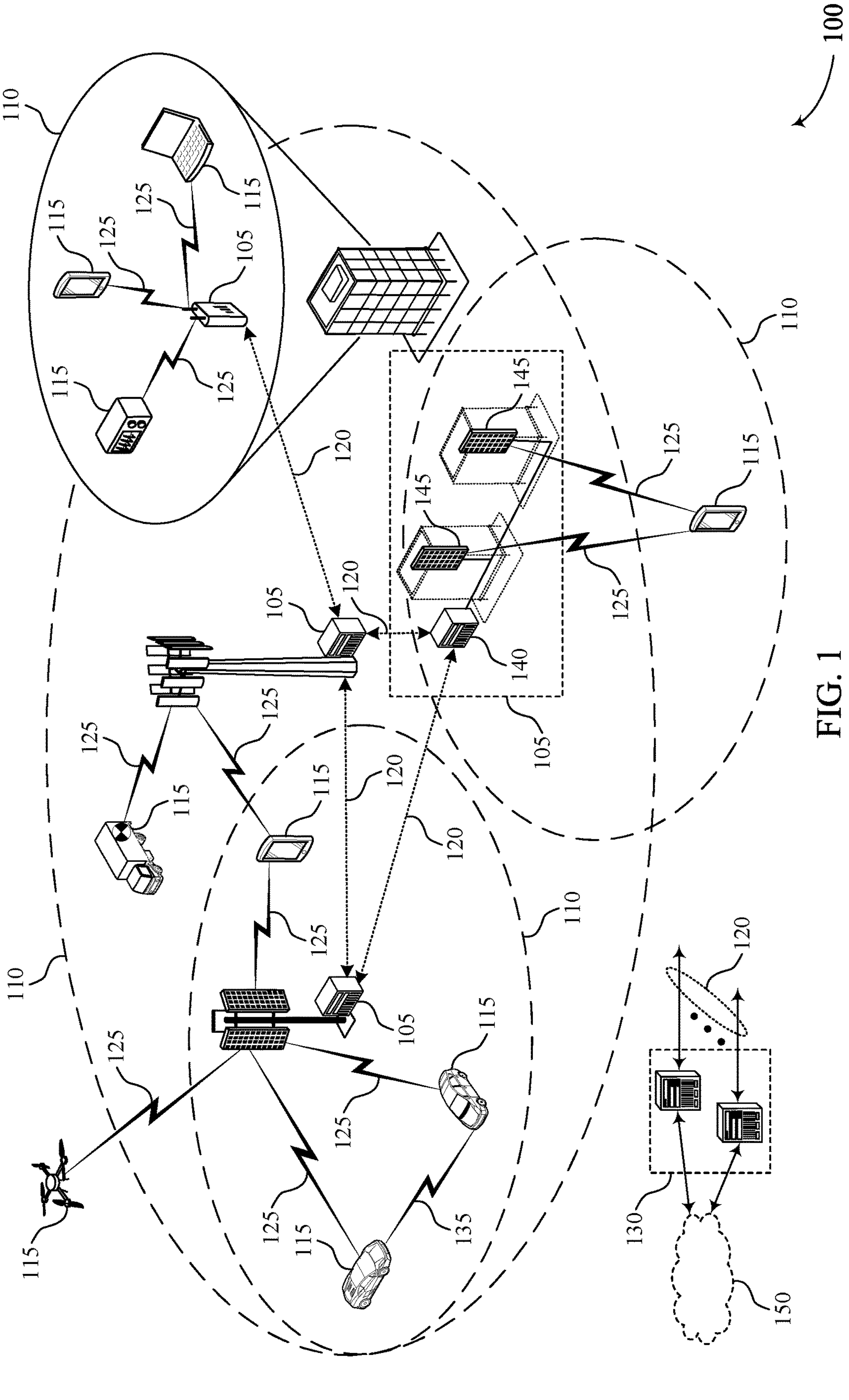
FIGS. 1 and 2 illustrate examples of wireless communications systems that support propagation delay compensation (PDC) enhancement in accordance with aspects of the present disclosure.

Some wireless communications systems may implement timing and synchronization procedures based on the transfer of timing information between devices such as user equipment (UE) and base station. In some cases, signaling between a UE and a base station may be associated with propagation delays, for example, delays between receiving and transmitting communications at the base station and UE, or other propagation delays based on signal propagation of over the air communications. To account for such propagation delays, a UE may send propagation delay compensation (PDC) reporting to inform the base station of propagation delay measurements. Based on transmitting the PDC report, the UE may implement a PDC procedure which accounts for the propagation delays to improve coordination and overall signaling efficiency in the network. For example, the UE and the base station may perform timing advance frame alignment, or the devices may use round trip timing (RTT) measurements to adjust reference timing associated with the signal transmissions. In some cases, the UE may transmit PDC reporting on periodic resources (e.g., positioning reference signal (PRS) or channel state information-reference signal (CSI-RS) resources) to notify another device of potential propagation delays.

In some other examples, the base station may configure the UE to transmit PDC reporting according to an aperiodic or semi-persistent scheduling configuration, and the UE may perform measurements using resources indicated in a PDC reporting configuration or a PDC reporting trigger sent by the base station. In some examples, the PDC reporting trigger may be included in a downlink control information (DCI) message, where a first field of the DCI (e.g., a two bit bitfield) indicates a request for transmission of the PDC report, and a second field of the DCI (e.g., a second two bit bitfield) indicates a reference signal indication for transmission of the PDC report. In some other examples, the PDC reporting trigger may be included in a single four bit bitfield in the DCI which indicates both the PDC request and the reference signal. To trigger semi-persistent PDC reporting, the base station may use one or more fields in a medium access control elements (MAC-CE) or a DCI which may further indicate an activation of the semi-persistent reporting and associated reference signal resources to use for transmission of the PDC report. In some other examples, the report indication and resources for the PDC report may be included in RRC signaling. In some other examples, the base station may request RTT information from a higher layer, and then the base station may relay information from the higher layer to the UE to use for PDC and transmission of one or more PDC reports.

Aspects of the disclosure are initially described in the context of wireless communications systems. Aspects of the disclosure are further illustrated by and described with reference to apparatus diagrams, system diagrams, control field configurations, process flows, and flowcharts that relate to PDC enhancement.

FIG. 1 illustrates an example of a wireless communications system 100 that supports PDC enhancement in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each of the base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each of the UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each of the served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each of the UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or a base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, signaling between a UE 115 and a base station 105 may be associated with signaling propagation delays, for example, delays between receiving and transmitting communications at the base station 105 and UE 115, or other propagation delays based on signal propagation over different medium. To account for such propagation delays, the UE 115 may send PDC reporting to inform the base station 105 of propagation delay measurements. Based on transmitting the PDC report, the UE 115 may implement a PDC procedure which accounts for the propagation delays to improve coordination and overall signaling efficiency in the network.

The base station 105 may transmit a periodic PDC reporting configuration or a PDC reporting trigger to the UE 115 so that the UE 115 may transmit PDC reporting according to an aperiodic or semi-persistent scheduling configuration. In some examples, the PDC reporting trigger may be included in DCI, where a first field of the DCI indicates a request for transmission of the PDC report, and a second field of the DCI indicates a reference signal indication for transmission of the PDC report. In some other examples, the PDC reporting trigger may be included in a single bitfield in the DCI which indicates both the PDC request and the reference signal. To trigger semi-persistent PDC reporting, the base station 105 may use one or more fields in a MAC-CE or a DCI which may further indicate an activation of the semi-persistent reporting and associated reference signal resources to use for transmission of the PDC report. In some other examples, the report indication and resources for the PDC report may be included in RRC signaling. In some other examples, the base station may request RTT information from a higher layer, and then the base station 105 may relay information from the higher layer to the UE 115.

Figure 2:
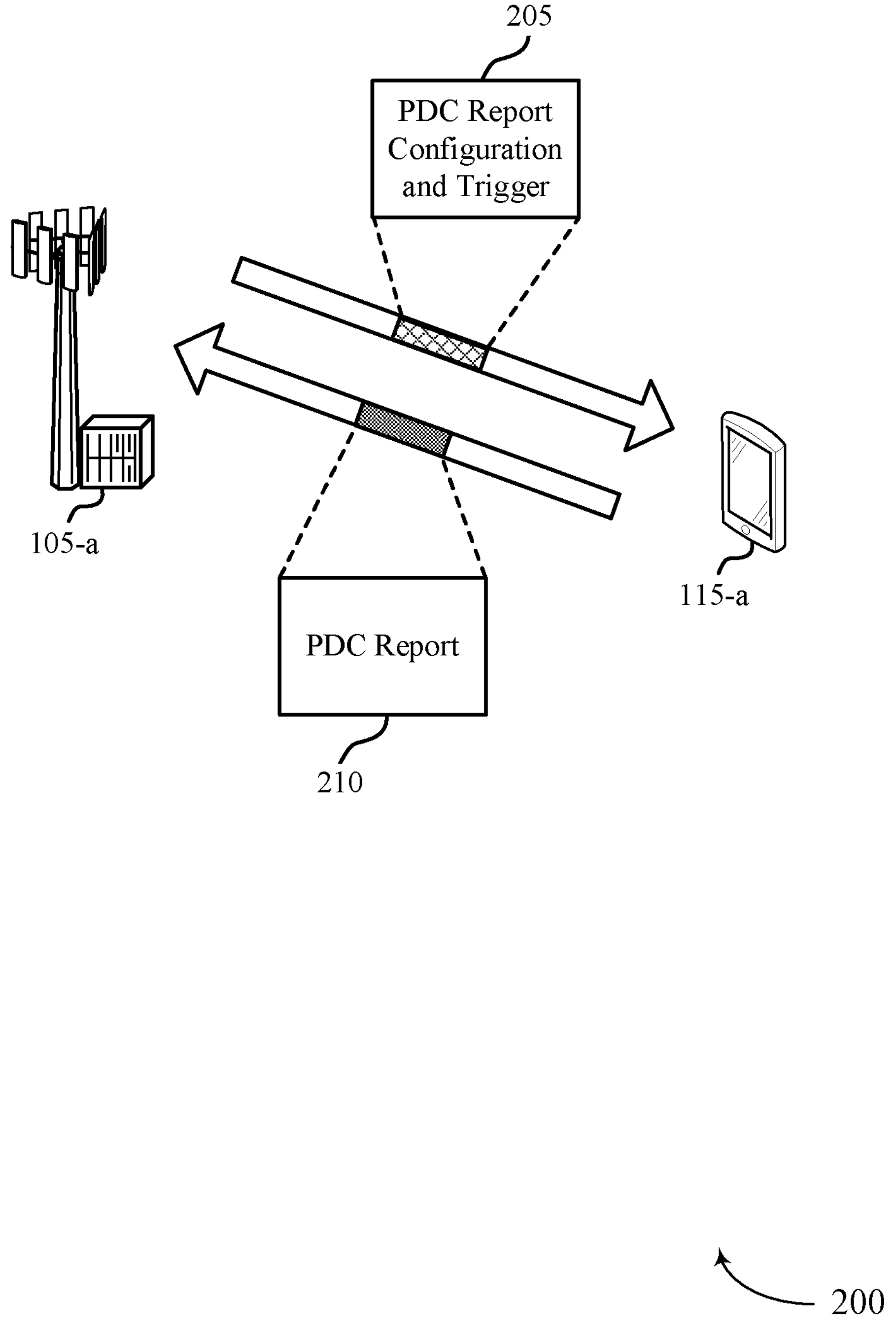

FIG. 2 illustrates an example of a wireless communications system 200 that supports PDC enhancement in accordance with aspects of the present disclosure. For example, the wireless communications system 200 may include signaling between a UE 115-*a* and a base station 105-*a*, which may be examples of corresponding devices described with reference to FIG. 1.

Establishing over-the-air (OTA) accurate timing and synchronization at the device level requires the transfer or exchange of timestamps between a controller (e.g., a base station 105-*a*) and other devices (e.g., such as a UE 115-*a*). In some cases, signaling between a base station 105-*a* and a UE 115-*a* may be associated with propagation delays, for example, delays between receiving and transmitting communications at the base station 105-*a* and the UE 115-*a*, and one or both devices may send PDC reporting to inform the other device of the propagation delays. Based on receiving the PDC report, a device may implement a PDC procedure which accounts for the propagation delays to improve coordination and overall signaling efficiency. In some other cases, a time sensitive network (TSN) grandmaster clock located at an end station (e.g., the base station 105-*a*) that is connected to the UE 115-*a* and is to be relayed to an end station connected to a second UE may introduce a combined uncertainty that exceeds a threshold uncertainty (e.g., 900 ns) associated with the network.

For the radio link between the base station 105-*a* and the UE 115-*a*, the propagation delay may be half of the timing advance. The UE 115-*a* and the base station 105-*a* may implement a number of different methods to determine the downlink propagation delay, and whether to perform PDC procedures to account for the delay. In some examples, the determination of the propagation delay may be timing advanced-based (e.g., legacy-timing advanced based) for the Uu interface, or time-difference measurement based. For example, the time-difference measurements may be based on two measurements, UE Rx-Tx time difference and base station Rx-Tx time difference, where the differences between receiving and transmitting communications (e.g., round trip timing (RTT)) at a UE 115-*a* and a base station 105-*a* may indicate the propagation delay.

To increase coordination between devices and to account for the propagation delay, the UE 115-*a* and the base station 105-*a* may perform timing advance frame alignment, or the devices may use RTT information to adjust reference timing associated with the signal transmissions. In some cases, the UE 115-*a* may transmit PDC reporting 210 on periodic resources (e.g., positioning reference signal (PRS) or channel state information-reference signal (CSI-RS)) to notify another device of potential propagation delays.

In some other examples, the base station 105-*a* may configure the UE 115-*a* to transmit PDC reporting 210 according to a periodic, aperiodic, or semi-persistent scheduling configuration, or any combination thereof, using a PDC report configuration and trigger 205. In some examples, the PDC report configuration and trigger 205 may be a DCI with a first field (e.g., a two bit bitfield) that indicates a request for transmission of the PDC report, and a second field (e.g., a second two bit bitfield) that indicates a reference signal indication for transmission of the PDC report. In some other examples, PDC report configuration and trigger 205 may be a DCI with a single four bit bitfield which indicates both the PDC request and the reference signal. To trigger semi-persistent PDC reporting, the base station may use a MAC-CE or a DCI to indicate an activation of the semi-persistent reporting and associated reference signal resources to use for transmission of the PDC report. In some other examples, the report indication and resources for the PDC report may be included in RRC signaling. In some other examples, the base station may request RTT information from a higher layer, and then the base station may relay information from the higher layer to the UE to use for PDC and transmission of PDC report 210.

Figure 3:
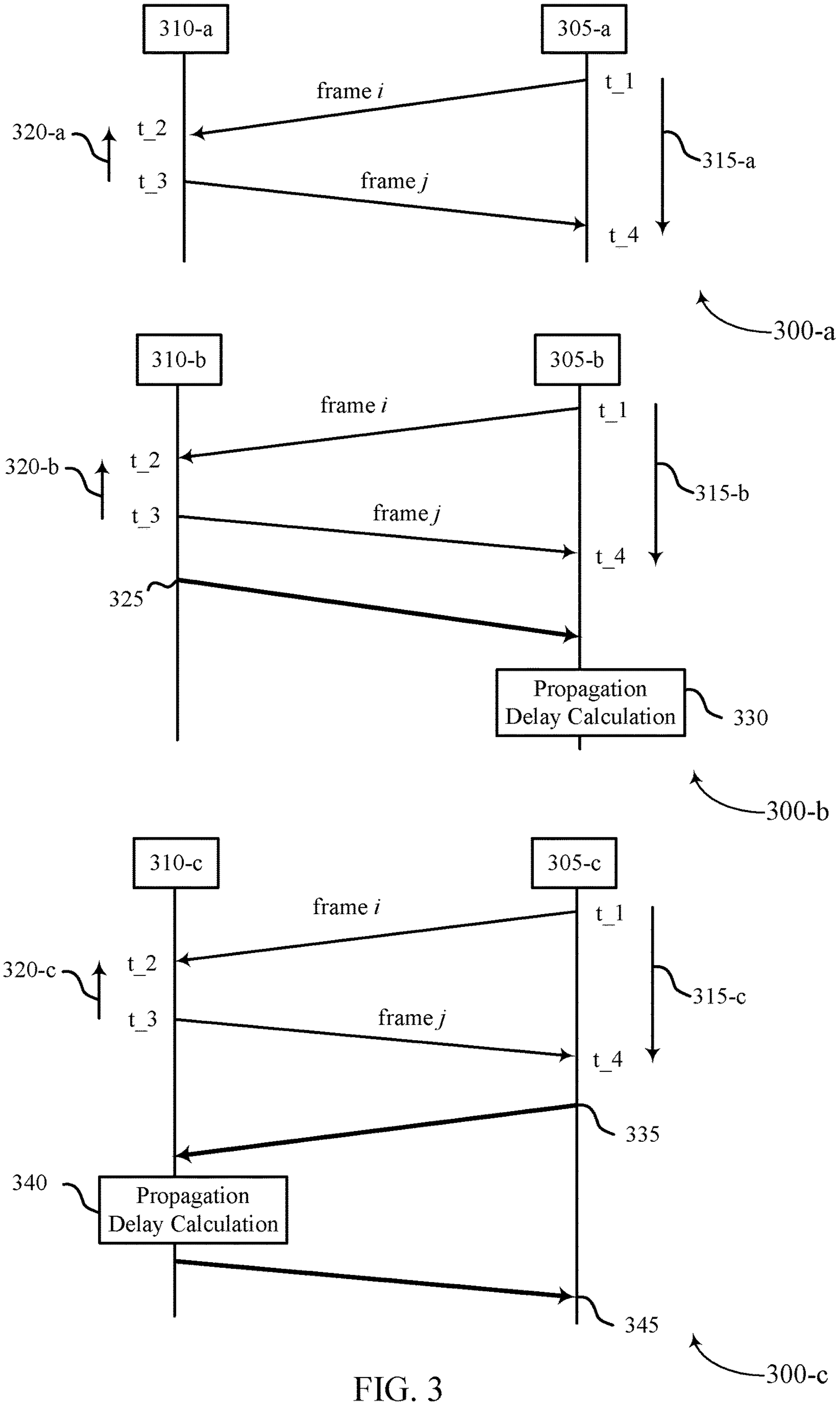
FIG. 3 illustrates example PDC process flows that support PDC enhancement in accordance with aspects of the present disclosure.

FIG. 3 illustrates example PDC process flows 300-*a*, 300-*b*, and 300-*c* that support PDC enhancement in accordance with aspects of the present disclosure. For example, PDC process flows 300-*a*, 300-*b*, and 300-*c* illustrate communications between wireless communication device 305 and wireless communication device 310, which maybe examples of a base station 105 and a UE 115 described with reference to FIG. 2. In some examples, PDC process flows 300-*a*, 300-*b*, and 300-*c* may implement RTT procedures (e.g., an enhanced RTT method) such that wireless communication device 305, 310, or both, may determine a value for downlink propagation delay.

In PDC process flow 300-*a*, UE 305-*a* may transmit an uplink message to the base station 310-*a* at $t_1$, and the base station may receive the uplink message at $t_2$. The base station 310-*a* may transmit a downlink message to the UE 305-*a* at $t_3$ (after delay 320-*a*), and the UE 305-*a* may receive the downlink message at $t_4$ (after delay 315-*a*). In PDC process flow 300-*a*, the time between transmission and reception (Rx-Tx) of the UE 305-*a* may be defined as 315-*a* ($t_4$-$t_1$), where $t_4$ is the UE received timing of a downlink subframe i, defined by the first detected path in time, and $t_1$ is the UE transmit timing of uplink subframe j (e.g., a subframe that is closest in time to the subframe i). The time between transmission and reception (Rx-Tx) of the base station 310-*a* may be defined as $t_3$-$t_2$ (320-*a*), where $t_3$ is the base station received timing of an uplink subframe i which includes an sounding reference signal (SRS) associated with the UE 305-*a* defined by the first detected path in time, and $t_2$ is the base station transmit timing of a downlink subframe j (e.g., a subframe that is closest in time to the subframe i received from the UE 305-*a*). The UE 305-*a* and the base station 310-*a* may exchange RTT information regarding Rx-Tx timing delays so that the UE perform delay compensation to account for the timing delays (e.g., $UE_{Rx\text{-}Tx}$+base $station_{Rx\text{-}Tx}$).

PDC process flow 300-*b* shows a one-step exchange procedure for RTT information transfer between a UE 305-*b* and a base station 310-*b*. In the one-step exchange procedure, the base station 110-*b* may directly signal the value of the base station Rx-Tx value (e.g., 320-*b*, the timing between $t_3$ and $t_2$) to the UE 305-*b* at 325. Using this information signaled from the base station 110-*b*, the UE 305-*b* may directly calculate the RTT or the propagation delay value at 330 by adding the time differences 320-*b* and 315-*b*.

PDC process flow 300-*c* shows a two-step exchange procedure for RTT information transfer between a UE 305-*c* and a base station 310-*c*. In the two-step exchange procedure, the UE 305-*c* may signal the value of the $UE_{Rx-Tx}$ value (e.g., 315-*c*, the timing between $t_4$ and $t_1$) to the base station 110-*c* at 335. At 340, upon receiving the $UE_{Rx-Tx}$ value from the UE 305-*c*, the base station 310-*c* may calculate the RTT or the propagation delay value by adding the values of timing time differences 320-*c* and 315-*c*. At 345, the base station 310-*c* may transmit the propagation delay value to the UE 305-*c* which may be used for PDC.

FIG. 4 illustrates example control field configurations 400-*a* and 400-*b* that support PDC enhancement in accordance with aspects of the present disclosure. For example, control field configurations 400-*a* and 400-*b* may be signaled from a scheduling device such as a base station to a receiving device such as a UE, which may be examples of corresponding devices described with reference to FIG. 2. In some examples, devices may exchange RTT information for calculation of PDC reporting, and devices may signal a combination of PRS and CSI-RS for RTT measurements and PDC reporting. Such PDC reporting may be periodic, aperiodic, or semi-persistent, and may be triggered using control field configurations 400-*a*, 400-*b*, or both.

The control field configuration 400-*a* may be a portion of a DCI message signaled by a base station which may be used to trigger aperiodic PDC reporting. For example, the base station may use the DCI to trigger aperiodic PDC reporting by the UE. As in control field configuration 400-*a*, the DCI may include two fields, with a first portion which includes a first bitfield indicating a PDC request 405, and a second portion which includes a second bitfield used to indicate a reference signal indication 410 to use for PDC reporting and a related BWP the PDC report is triggered on. The value of the respective bitfields may indicate a number of different options for PDC reporting. For example, for the PDC request 405, a value of 00 may indicate no PDC report request, a value of 01 may indicate the PRS to be used for PDC reporting, a value of 10 may indicate CSI-RS used for PDC reporting, and a value of 11 may indicate a reserved status. For the bitfield of the reference signal indication 410, a value of 00 may indicate a reference signal in BWP 0 for PDC reporting, a value of 01 may indicate a reference signal in BWP 1 for PDC reporting, a value of 10 may indicate a reference signal in BWP 2 for PDC reporting, and a value of 11 may indicate a reference signal in BWP 3 for PDC reporting.

Additionally or alternatively, the base station may signal the PDC request and the associated reference signal for PDC reporting in a single field of the DCI, as in control field configuration 400-*b*. In such cases, a single PDC request 415 may include a four-bit bitmap to indicate a number of different options for PDC reporting. For example, a bitfield value of 0000 may indicate no PDC report request, a bitfield value of 0001 may indicate PRS in the lowest BWP for PDC reporting, a bitfield value of 0010 may indicate PRS in the second lowest BWP for PDC reporting, a bitfield value of 0011 may indicate PRS in the second highest BWP for PDC reporting, a bitfield value of 0100 may indicate PRS in the highest BWP for PDC reporting, a bitfield value of 0101 may indicate CSI-RS in the lowest BWP for PDC reporting, a bitfield value of 0110 may indicate CSI-RS in the second lowest BWP for PDC reporting, a bitfield value of 0111 may indicate CSI-RS in the second highest BWP for PDC reporting, a bitfield value of 0100 may indicate CSI-RS in the highest BWP for PDC reporting, and bitfield values of 1001-1111 are reserved.

In some other examples, a DCI may be used to trigger semi-persistent reporting of the PDC report. For example, control field configurations 400-*a* and 400-*b* may be used to indicate the activation and resources used for semi-persistent PDC reporting. In some examples, the DCI may be associated with a radio network temporary identifier (RNTI), such as an SP-PDC-RNTI, which may indicate the semi-persistent PDC reporting being indicated by the DCI. In some cases, a UE may distinguish the DCI used to activate or deactivate the semi-persistent PDC reporting. For example, information in the DCI may be a valid activation or a valid release of semi-persistent channel status information (CSI) transmissions. For some DCI formats (e.g., DCI format 0_1) a value of HARQ process number set to all 0's and a redundancy version set to 00's may indicate a semi-persistent CSI activation. Additionally or alternatively, a value of HARQ process number set to all 0's and a redundancy version set to 00's, a modulation and coding scheme set to all 1's, and various values for resource block assignment may indicate a semi-persistent CSI deactivation.

Figure 5:
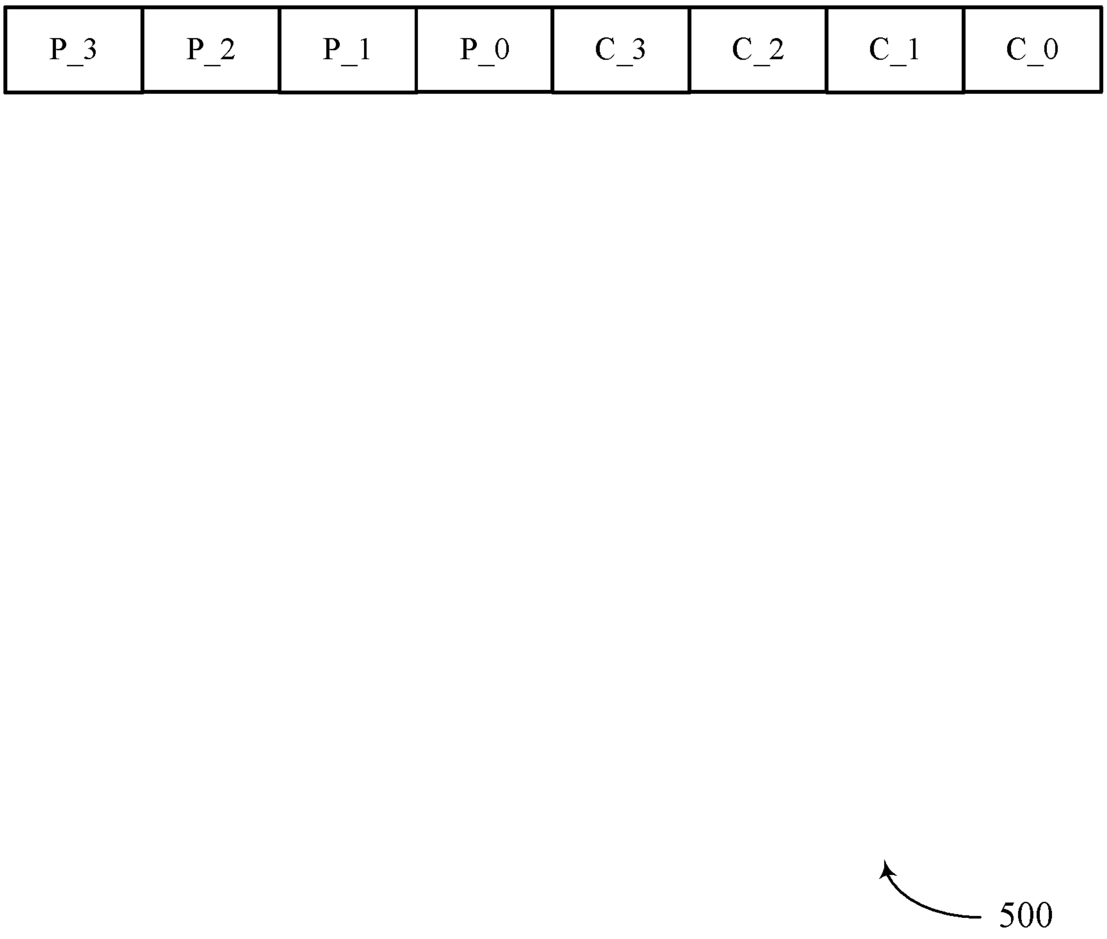

FIG. 5 illustrates an example of a control field configuration 500 that supports PDC enhancement in accordance with aspects of the present disclosure. For example, control field configurations 500 may be signaled from a scheduling device such as a base station to a receiving device such as a UE, which may be examples of corresponding devices described with reference to FIG. 2. In some examples, devices may exchange RTT information for calculation of PDC reporting, and devices may signal a combination of PRS and CSI-RS for RTT measurements and PDC reporting. Such PDC reporting may be periodic, aperiodic, or semi-persistent, and may be triggered using control field configuration 500.

In some examples, a base station may transmit a MAC-CE to trigger a semi-persistent PDC report. In such examples, the base station may include information in a MAC-CE sub-header or a logical channel identifier (LCID) to indicate a downlink shared channel to be used for semi-persistent PDC report activation and deactivation. In some cases, the base station may include the information in a reserved sub-header or LCID (e.g., LCID 35).

The control field configuration 500 may be a LCID configuration in a MAC-CE which may be used to trigger the semi-persistent PDC report. Various portions of the LCID configuration may indicate different information associated with the PDC reporting trigger. For example, $P_1$ indicates the activation or deactivation status of the semi-persistent PDC reporting trigger with PRS within PDC-ReportConfigToAddModList, $P_0$ indicates a semi-persistent PDC reporting trigger with PRS in the indicated lowest BWP, and $C_i$ indicates the activation or deactivation status of the semi-persistent PDC reporting trigger with CSI-RS within PDC-ReportConfigToAddModList.

In some other examples, a base station may use an RRC configuration to indicate PDC reporting to a UE. For example, the base station may configure the resource for the PDC jointly with the report using RRC parameters for PDC resource configuration and reporting configuration (e.g., PDC-ResourceConfig and PDC-ReportConfig). In such cases, both PRS and CSI-RS resource configurations used for PDC may be indicated in PDC-ResourceConfig.

The RRC parameter including the PDC resource configuration (e.g., PDC-ResourceConfig), may indicate both PRS and CSI-RS resource configurations. The RRC parameter for resource configuration may be associated with a reference signal configuration identifier (e.g., RS-ResourceConfigId) indicated in the PDC reporting configuration to refer to an instance of the PDC reporting trigger, and may be used to identify one reference signal resource used for PDC reporting. Additionally or alternatively, the RRC parameter including the PDC resource configuration (e.g., PDC-ResourceConfig) may include a list resource set list (e.g., RS-Resource SetList) which may include a list of references including NZP CSI-RS resources or PRS resources used for PDC reporting, along with a resource type (e.g., resource Type) which may be periodic, semi-persistent, or aperiodic.

The RRC parameter including the PDC report configuration (e.g., PDC-ReportConfig), may indicate a resource configuration ID for either PRS or CSI-RS, and a reporting configuration type (e.g., reportConfigType) which can be periodic, semi-persistent, or aperiodic.

In some other examples, the base station may configure the PDC report without jointly configuring the associated resource using an RRC parameter for the PDC reporting configuration (e.g., PDC-ReportConfig). In such cases, additional RRC parameters such as an RRC parameter indicating a reference signal resource configuration ID (e.g., RS-ResourceConfigId in PDC-ReportConfig) may indicate an existing CSI-RS resource for PDC reporting. The PDC reporting configuration may further indicate a reporting configuration type (e.g., reportConfigType) which may be periodic, semi-persistent, or aperiodic. Additionally or alternatively the PDC reporting configuration may indicate a reporting periodicity and offset (e.g., PDC-ReportPeriodicityAndOffset, which may indicate times in which the PDC should be reported for periodic and semi-persistent reporting types.

In some other examples, a dedicated PDC configuration may not be signaled for CSI-RS RTT based PDC reporting. For example, an additional indication (e.g., rx-txdiff) may be added to a report quantity (e.g., reportQuantity) in the CSI reporting configuration (e.g., CSI-ReportConfig). One possible report quantity of the CSI report configuration may be:

```
reportQuantity                  CHOICE {
none                        NULL,
cri-RI-PMI-CQI                      NULL,
cri-RI-i1                     NULL,
cri-RI-i1-CQI                   SEQUENCE {
pdsch-BundleSizeForCSI                  ENUMERATED {n2, n4}
OPTIONAL    -- Need S
},
cri-RI-CQI                     NULL,
cri-RSRP                      NULL,
ssb-Index-RSRP                      NULL,
cri-RI-LI-PMI-CQI                     NULL
rx-txdiff                      NULL
},
```

Figure 6:
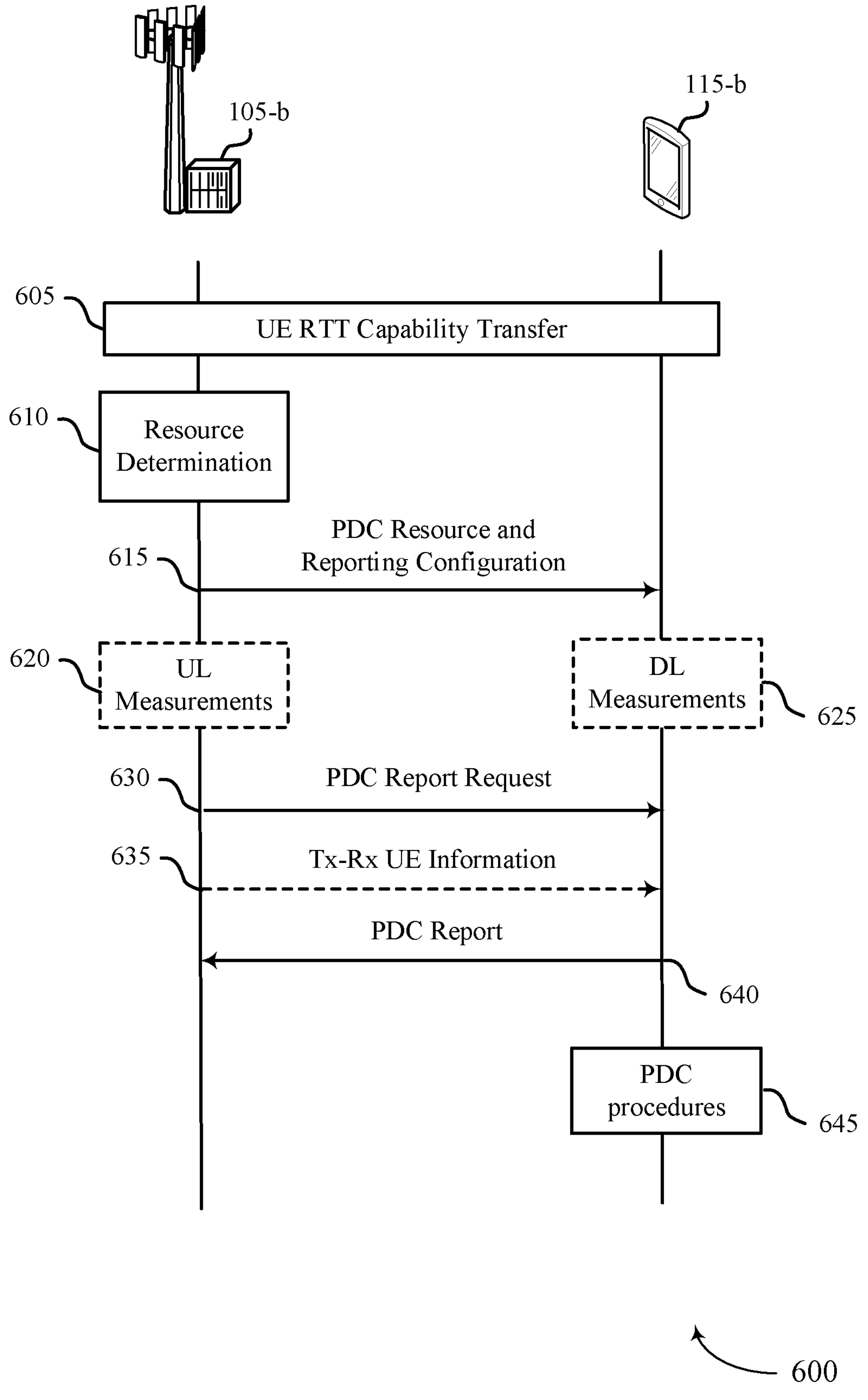
FIGS. 6 and 7 illustrates example process flows that support PDC enhancement in accordance with aspects of the present disclosure.

FIG. 6 illustrates an example of a process flow 600 that supports PDC enhancement in accordance with aspects of the present disclosure. The process flow 600 may implement aspects of wireless communications systems 100 and 200, or may be implemented by aspects of the wireless communications system 100 and 200. For example, the process flow 600 may illustrate operations between a UE 115-*b* and a base station 105-*b*, which may be examples of corresponding devices described with reference to FIGS. 1 and 2. In the following description of the process flow 600, the operations between the base station 105-*b* and the UE 115-*b* may be transmitted in a different order than the example order shown, or the operations may be performed in different orders or at different times or by different devices. Additionally or alternatively, some operations may also be omitted from the process flow 600, and other operations may be added to the process flow 600.

At 605, the base station 105-*b* and the UE 115-*b* may participate in UE RTT capability transfer. During UE capability transfer, the base station 105-*b* may obtain one or more RTT measurements from the UE 115-*b* (e.g., ue-Rx-TxTimeDiffMeasurements-r16 and NR-UL-SRS-Capability) and any other information elements that the UE 115-*b* may use to inform the base station 105-*b* of its capabilities regarding RTT measurements and SRS signaling. In some cases, the UE capability transfer may include information which allows the base station 105-*b* to decide on how to perform the RTT procedure.

At 610, the base station 105-*b* may determine the resource configuration and the number of available resources for uplink SRS and CSI-RS signaling for the UE 115-*b* to use for performing RTT measurements.

At 615, the base station 105-*b* may transmit an RTT measurement configuration (e.g., a resource and reporting configuration) to the UE 115-*b*. The RTT measurement configuration may indicate a measurement procedure and associated reference signal transmissions for the UE 115-*b* to use for performing RTT measurements. For example, the base station 105-*b* may configure uplink SRS transmissions using RRC signalling (e.g., SRS-Config information element), and may configure downlink CSI-RS measurements at the UE 115-*b* which may enable RTT measurements (e.g., $UE_{Rx-Tx}$) of downlink CSI-RS signals and may instruct the UE to include the RTT values in the measurement report.

At 620 and 625, the base station 105-*b* transmits CSI-RS and the UE transmits uplink-SRS to perform downlink to uplink exchange between the base station 105-*b* and the UE 115-*b*. The UE 115-*b* determines the $UE_{Rx-Tx}$ time difference according to UE measurements configuration, and the base station 105-*b* determines the base station Rx-Tx time difference measurement.

At 630, the base station 105-*b* transmits an PDC report request and a reference signal resource for performing one or more RTT measurements associated with the PDC report. In some examples, the configuration for transmitting the PDC report includes a request for sending the PDC report.

At 635, the base station 105-*b* may transmit the base station Tx-Rx time difference measurements to the UE 115-*b*. In some cases, the base station 105-*b* may transmit the indication using RRC signalling, DCI, or a MAC CE. At 640, the UE 115-*b* may transmit the PDC report 640 including the RTT measurements.

At 645, based on the PDC report configuration including the PDC report request, and the measurements received from the base station 105-*b*, the UE 115-*b* may perform PDC to compensate for the propagation delays.

Figure 7:
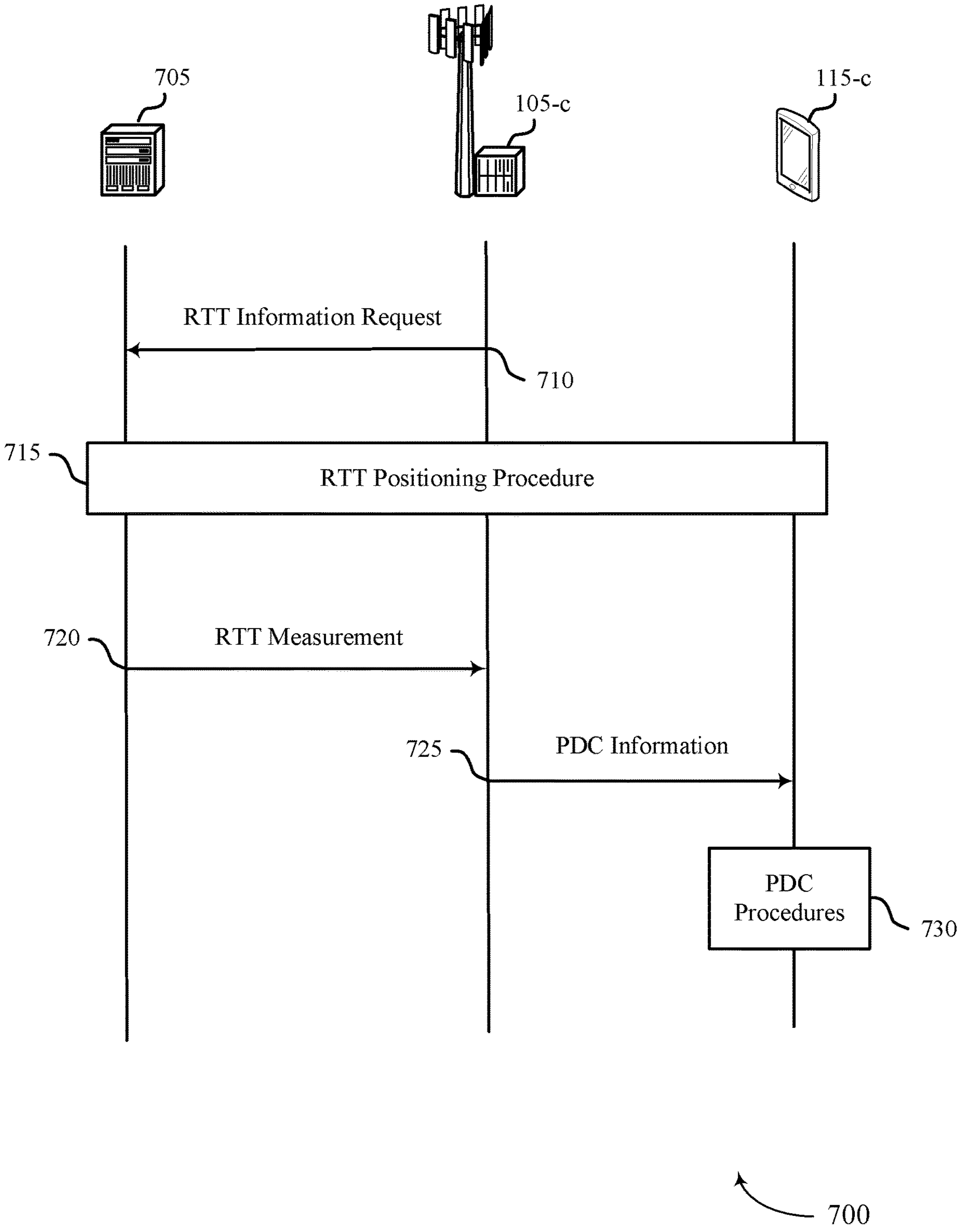

FIG. 7 illustrates an example of a process flow 700 that supports PDC enhancement in accordance with aspects of the present disclosure. The process flow 700 may implement aspects of wireless communications systems 100 and 200, or may be implemented by aspects of the wireless communications system 100 and 200. For example, the process flow 700 may illustrate operations between a UE 115-*c* and a base station 105-*c*, which may be examples of corresponding devices described with reference to FIGS. 1 and 2. Process flow 700 may also incorporate signaling operations at or from a logical node function (LMF). In the following description of the process flow 700, the operations between the base station 105-*c*, the UE 115-*c*, and the LMF 705 may be transmitted in a different order than the example order shown, or the operations may be performed in different orders or at different times or by different devices. Additionally or alternatively, some operations may also be omitted from the process flow 700, and other operations may be added to the process flow 700.

In some examples, the base station 105-*c* may request RTT information for the UE 115-*c* from an upper layer in order to transmit PDC information to the UE 115-*c*. At 710, the base station 105-*c* may transmit an RTT information request to the LMF 705. In such cases, the RTT information may already be known by the LMF.

At 715, the LMF 705, the base station 105-*c*, and the UE 115-*c* may perform RTT positioning using a PRS and SRS positioning configuration. In some examples, the positioning architecture may be co-deployed with an IIOT network (e.g., LMF 705 may communicate with the base station 105-*c* and the UE 115-*c* using an LTE positioning protocol, a NR positioning protocol, or other positioning procedure.

At 720, based on receiving the RTT measurement request and performing RTT positioning with the base station 105-*c* and the UE 115-*c*, the LMF may transmit RTT measurements to the base station 105-*c*, and at 725, the base station 105-*c* may forward the RTT information for PDC to the UE 115-*c*.

At 730, using the received RTT measurements and accompanying PDC information, the UE 115-*c* may perform PDC. Additionally or alternatively, the base station 105-*c* may perform pre-compensation procedures based on the received RTT measurements.

Figure 8:
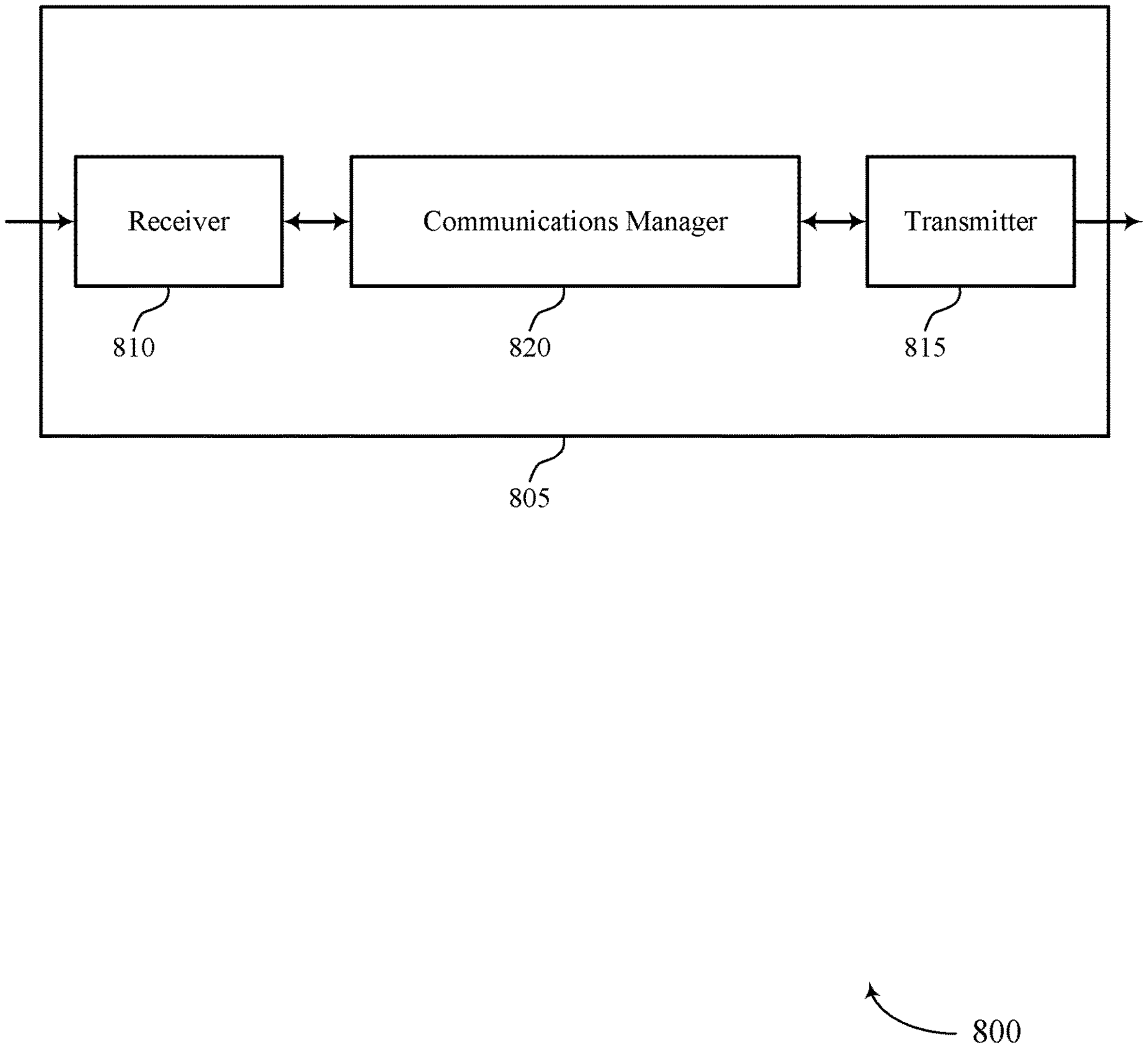
FIGS. 8 and 9 show block diagrams of devices that support PDC enhancement in accordance with aspects of the present disclosure.

FIG. 8 shows a block diagram 800 of a device 805 that supports PDC enhancement in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to PDC enhancement). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to PDC enhancement). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of PDC enhancement as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. For example, the communications manager 820 may be configured as or otherwise support a means for receiving, from a base station, an indication of a configuration for transmitting a PDC report and a reference signal resource for performing one or more round trip timing measurements associated with the PDC report. The communications manager 820 may be configured as or otherwise support a means for receiving, from the base station, control signaling including a request for the UE to transmit the PDC report including the one or more round trip timing measurements. The communications manager 820 may be configured as or otherwise support a means for transmitting, to the base station, the PDC report in accordance with the request. The communications manager 820 may be configured as or otherwise support a means for performing one or more PDC procedures based on the one or more RTT measurements.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for more efficient utilization of communication resources, and increased device coordination.

Figure 9:
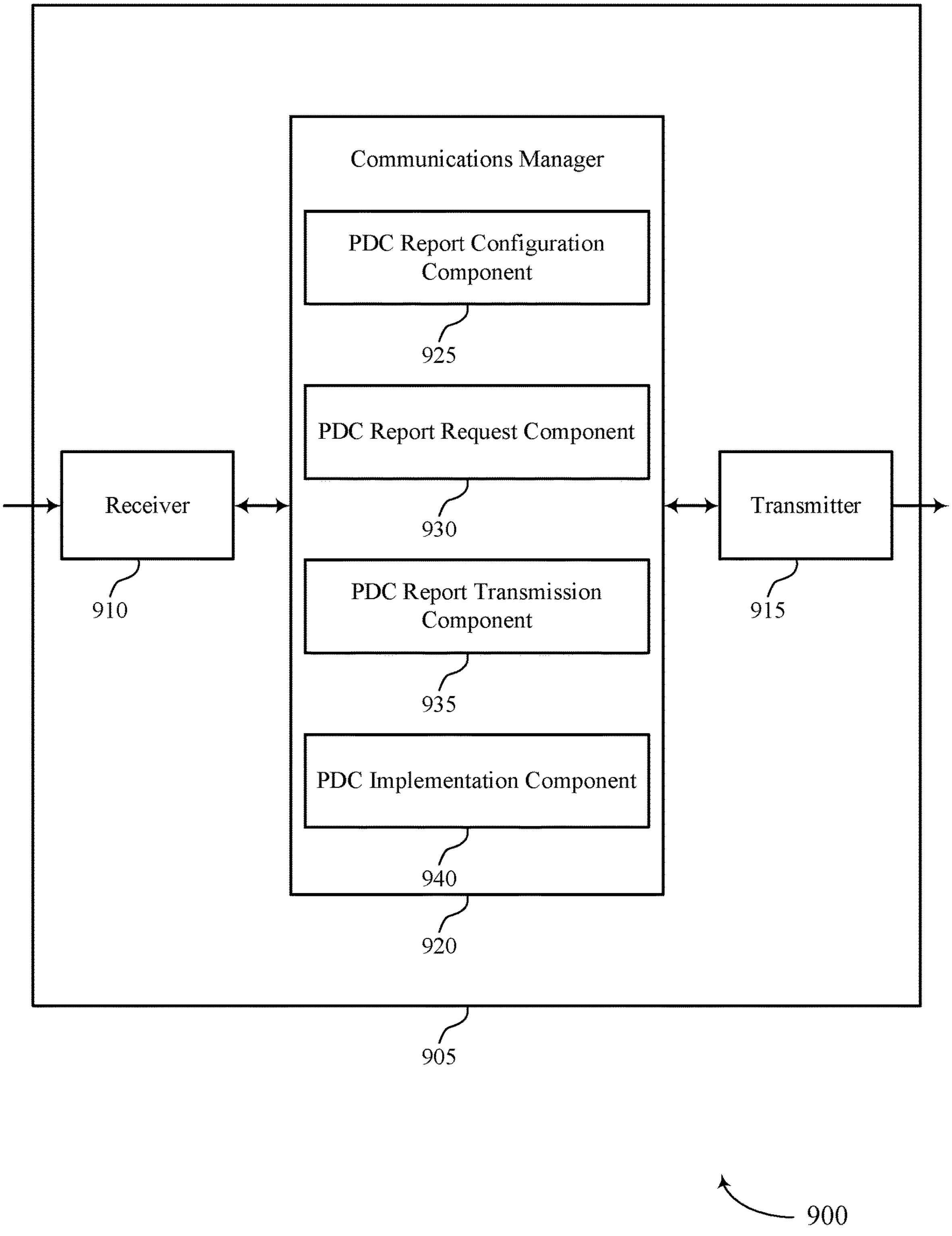

FIG. 9 shows a block diagram 900 of a device 905 that supports PDC enhancement in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to PDC enhancement). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to PDC enhancement). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of PDC enhancement as described herein. For example, the communications manager 920 may include a PDC report configuration component 925, a PDC report request component 930, a PDC report transmission component 935, a PDC implementation component 940, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. The PDC report configuration component 925 may be configured as or otherwise support a means for receiving, from a base station, an indication of a configuration for transmitting a PDC report and a reference signal resource for performing one or more round trip timing measurements associated with the PDC report. The PDC report request component 930 may be configured as or otherwise support a means for receiving, from the base station, control signaling including a request for the UE to transmit the PDC report including the one or more round trip timing measurements. The PDC report transmission component 935 may be configured as or otherwise support a means for transmitting, to the base station, the PDC report in accordance with the request. The PDC implementation component 940 may be configured as or otherwise support a means for performing one or more PDC procedures based on the one or more RTT measurements.

Figure 10:
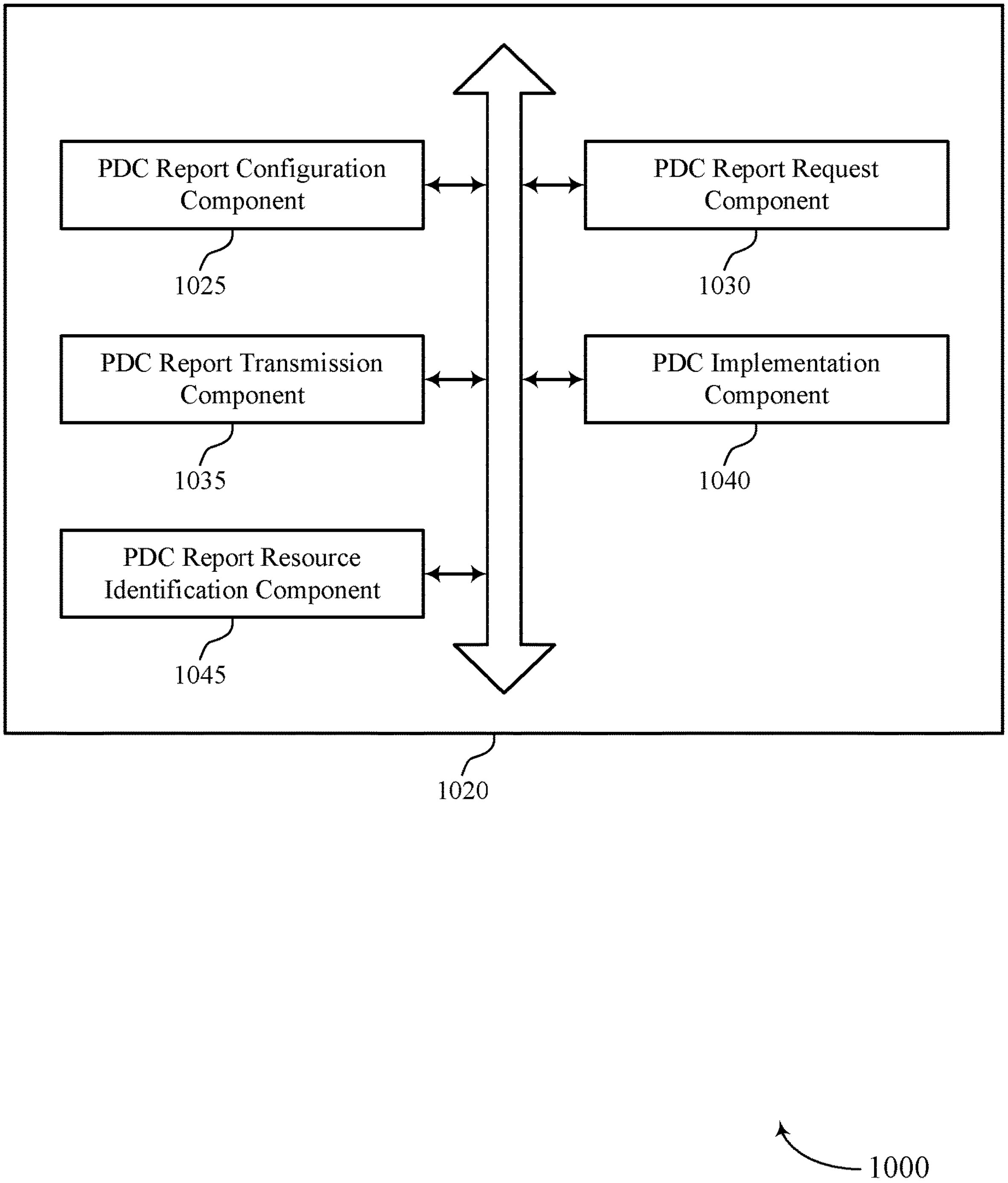
FIG. 10 shows a block diagram of a communications manager that supports PDC enhancement in accordance with aspects of the present disclosure.

FIG. 10 shows a block diagram 1000 of a communications manager 1020 that supports PDC enhancement in accordance with aspects of the present disclosure. The communications manager 1020 may be an example of aspects of a communications manager 820, a communications manager 920, or both, as described herein. The communications manager 1020, or various components thereof, may be an example of means for performing various aspects of PDC enhancement as described herein. For example, the communications manager 1020 may include a PDC report configuration component 1025, a PDC report request component 1030, a PDC report transmission component 1035, a PDC implementation component 1040, a PDC report resource identification component 1045, or any combination thereof. Each of these components may communicate, directly or indirectly, with one another (e.g., via one or more buses).

The communications manager 1020 may support wireless communication at a UE in accordance with examples as disclosed herein. The PDC report configuration component 1025 may be configured as or otherwise support a means for receiving, from a base station, an indication of a configuration for transmitting a PDC report and a reference signal resource for performing one or more round trip timing measurements associated with the PDC report. The PDC report request component 1030 may be configured as or otherwise support a means for receiving, from the base station, control signaling including a request for the UE to transmit the PDC report including the one or more round trip timing measurements. The PDC report transmission component 1035 may be configured as or otherwise support a means for transmitting, to the base station, the PDC report in accordance with the request. The PDC implementation component 1040 may be configured as or otherwise support a means for performing one or more PDC procedures based on the one or more RTT measurements.

In some examples, the control signaling includes DCI indicating an aperiodic reporting configuration for transmitting the PDC report, and the PDC report transmission component 1035 may be configured as or otherwise support a means for transmitting, to the base station, one or more PDC reports in accordance with the aperiodic reporting configuration, and performing one or more PDC procedures based on the one or more RTT measurements.

In some examples, the control signaling includes DCI indicating an aperiodic reporting configuration for transmitting the PDC report, and the PDC report request component 1030 may be configured as or otherwise support a means for receiving, in a first field of the DCI, a first indication of the request for the UE to transmit the PDC report. In some examples, the control signaling includes DCI indicating an aperiodic reporting configuration for transmitting the PDC report, and the PDC report request component 1030 may be configured as or otherwise support a means for receiving, in a second field of the DCI, a second indication of the reference signal resource for performing the one or more round trip timing measurements associated with the PDC report.

In some examples, the reference signal resource indicates a bandwidth part on which the PDC report is to be transmitted.

In some examples, the first field of the DCI and the second field of the DCI each include a separate bitmap for conveying the first indication and the second indication.

In some examples, the control signaling includes DCI indicating an aperiodic reporting configuration for transmitting the PDC report, and the PDC report request component 1030 may be configured as or otherwise support a means for receiving, in a single field of the DCI, the first indication of the request for the UE to transmit the PDC report and an indication of the reference signal resource for performing the one or more round trip timing measurements associated with the PDC report.

In some examples, the control signaling includes a MAC-CE indicating a semi-persistent reporting configuration for transmitting the PDC report, and the PDC report request component 1030 may be configured as or otherwise support a means for transmitting, to the base station, one or more PDC reports in accordance with the semi-persistent reporting configuration, and performing one or more PDC procedures based on the one or more RTT measurements.

In some examples, the control signaling includes a MAC-CE indicating a semi-persistent reporting configuration for transmitting the PDC report, and the PDC report configuration component 1025 may be configured as or otherwise support a means for receiving, in a sub-header of the MAC-CE, a first indication of a downlink shared channel associated with an activation or deactivation of the semi-persistent reporting configuration for transmitting the PDC report.

In some examples, one or more fields of the sub-header indicate the activation or deactivation of the semi-persistent reporting configuration based on a positioning reference signal for the semi-persistent reporting.

In some examples, an additional one or more fields of the sub-header indicate the activation or deactivation of the semi-persistent reporting configuration and further indicate a channel status information reference signal for semi-persistent reporting of the PDC report.

In some examples, the control signaling includes DCI indicating a semi-persistent reporting configuration for transmitting the PDC report, and the PDC report transmission component 1035 may be configured as or otherwise support a means for transmitting, to the base station, one or more PDC reports in accordance with the semi-persistent reporting configuration, and performing one or more PDC procedures based on the one or more RTT measurements.

In some examples, the PDC report request component 1030 may be configured as or otherwise support a means for receiving, in a first field of the DCI, a first indication of the request for the UE to transmit the PDC report. In some examples, the PDC report request component 1030 may be configured as or otherwise support a means for receiving, in a second field of the DCI, a second indication of the reference signal resource for performing the one or more round trip timing measurements associated with the PDC report.

In some examples, the DCI is associated with a radio network temporary identifier indicating the semi-persistent reporting configuration in the DCI.

In some examples, one or more bitfield values of the DCI indicate an activation or deactivation of the semi-persistent reporting configuration for transmitting the PDC report.

In some examples, the indication of the configuration for transmitting the PDC report includes radio resource control signaling, and the PDC report resource identification component 1045 may be configured as or otherwise support a means for identifying the reference signal resource for performing the one or more round trip timing measurements based on the radio resource control signaling, the reference signal resource including a channel state information reference signal or a positioning reference signal.

In some examples, the radio resource control signaling includes respective configurations of both the PDC report and the reference signal resource.

In some examples, the radio resource control signaling includes a single configuration for transmission of the PDC report.

Figure 11:
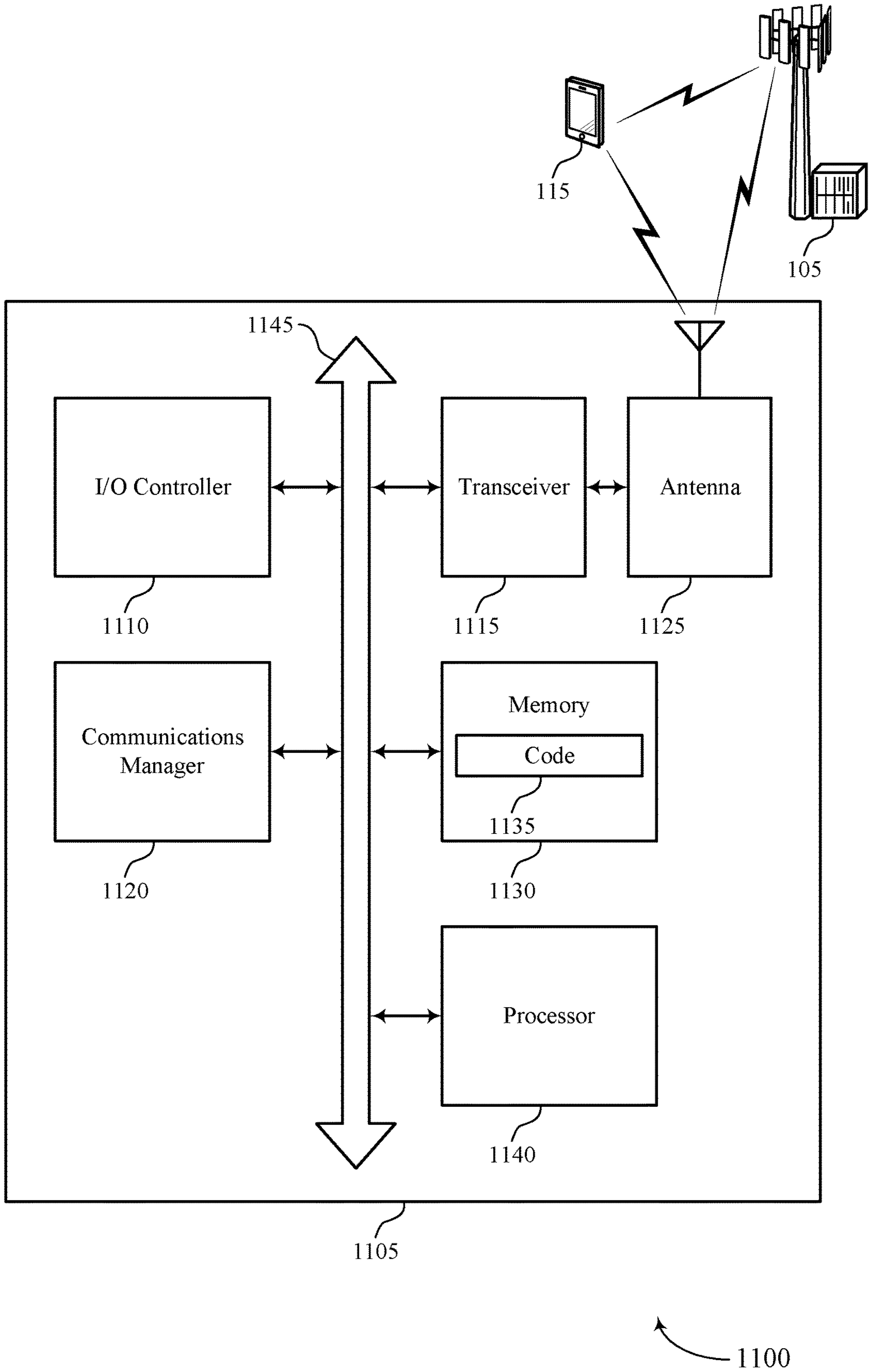
FIG. 11 shows a diagram of a system including a device that supports PDC enhancement in accordance with aspects of the present disclosure.

FIG. 11 shows a diagram of a system 1100 including a device 1105 that supports PDC enhancement in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting PDC enhancement). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for receiving, from a base station, an indication of a configuration for transmitting a PDC report and a reference signal resource for performing one or more round trip timing measurements associated with the PDC report. The communications manager 1120 may be configured as or otherwise support a means for receiving, from the base station, control signaling including a request for the UE to transmit the PDC report including the one or more round trip timing measurements. The communications manager 1120 may be configured as or otherwise support a means for transmitting, to the base station, the PDC report in accordance with the request. The communications manager 1120 may be configured as or otherwise support a means for performing one or more PDC procedures based on the one or more RTT measurements.

By including or configuring the communications manager 1120 in accordance with examples as described herein, the device 1105 may support techniques for improved communication reliability, reduced latency, improved user experience related to enhanced propagation delay management, more efficient utilization of communication resources, improved coordination between devices, increased signaling efficiency and device performance based on more accurate PDC.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of PDC enhancement as described herein, or the processor 1140 and the memory 1130 may be otherwise configured to perform or support such operations.

Figure 12:
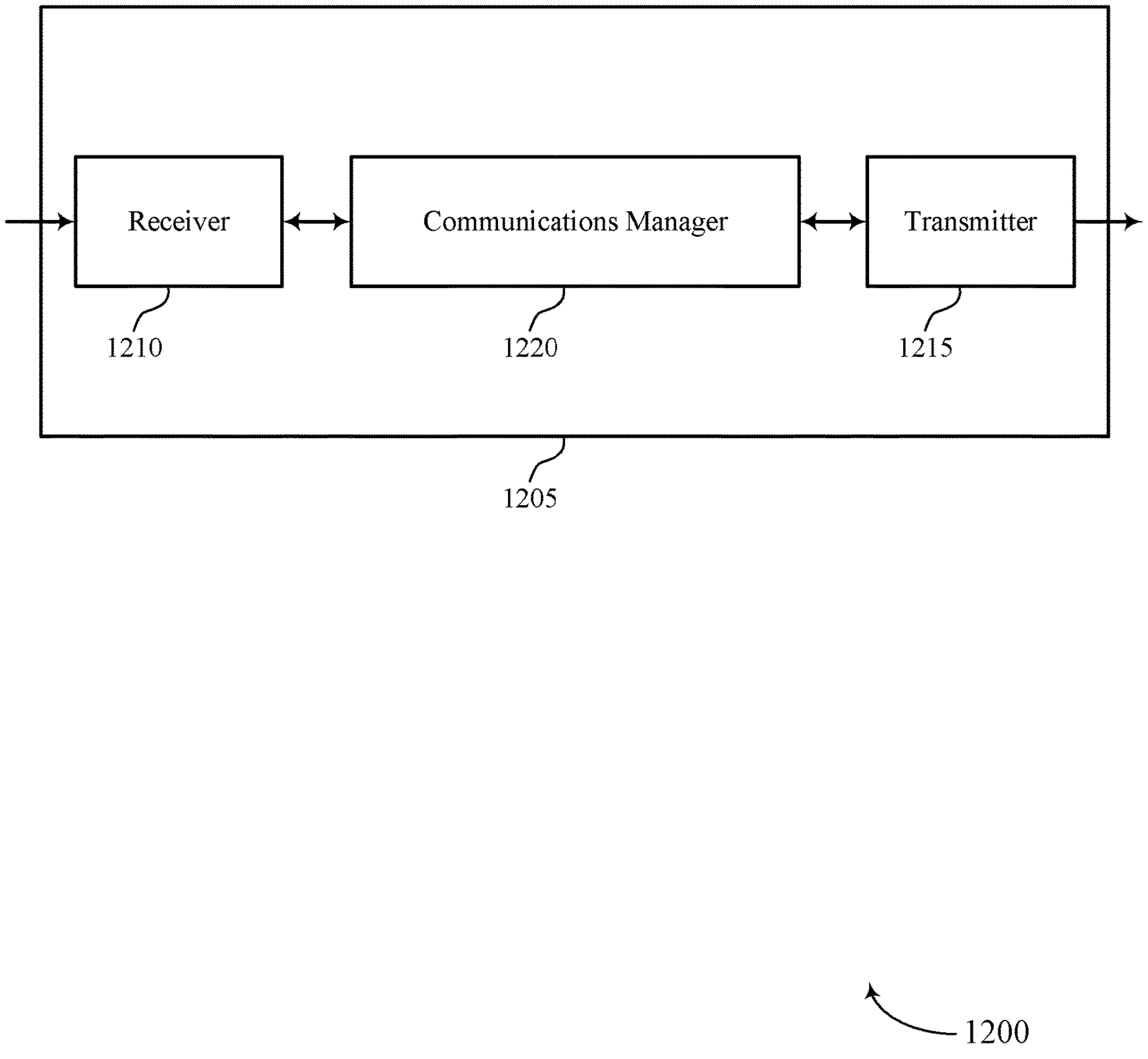
FIGS. 12 and 13 show block diagrams of devices that support PDC enhancement in accordance with aspects of the present disclosure.

FIG. 12 shows a block diagram 1200 of a device 1205 that supports PDC enhancement in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to PDC enhancement). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to PDC enhancement). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of PDC enhancement as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. For example, the communications manager 1220 may be configured as or otherwise support a means for transmitting, to a UE, an indication of a configuration for transmitting a PDC report and a reference signal resource for performing one or more round trip timing measurements associated with the PDC report. The communications manager 1220 may be configured as or otherwise support a means for transmitting, to the UE, control signaling including a request for the UE to transmit the PDC report including the one or more round trip timing measurements. The communications manager 1220 may be configured as or otherwise support a means for receiving, from the UE, the PDC report in accordance with the request.

Additionally or alternatively, the communications manager 1220 may support wireless communication at a base station in accordance with examples as disclosed herein. For example, the communications manager 1220 may be configured as or otherwise support a means for transmitting, to a location management function, a request for round trip timing information associated with communications between the base station and a UE. The communications manager 1220 may be configured as or otherwise support a means for transmitting, to the UE, a reference signal configuration for performing a PDC procedure associated with the round trip timing information. The communications manager 1220 may be configured as or otherwise support a means for receiving, from the location management function, the round trip timing information including one or more round trip timing measurements in accordance with the transmitted request. The communications manager 1220 may be configured as or otherwise support a means for transmitting, to the UE, PDC information based on the one or more round trip timing measurements.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for more efficient utilization of communication resources, and increased device coordination.

Figure 13:
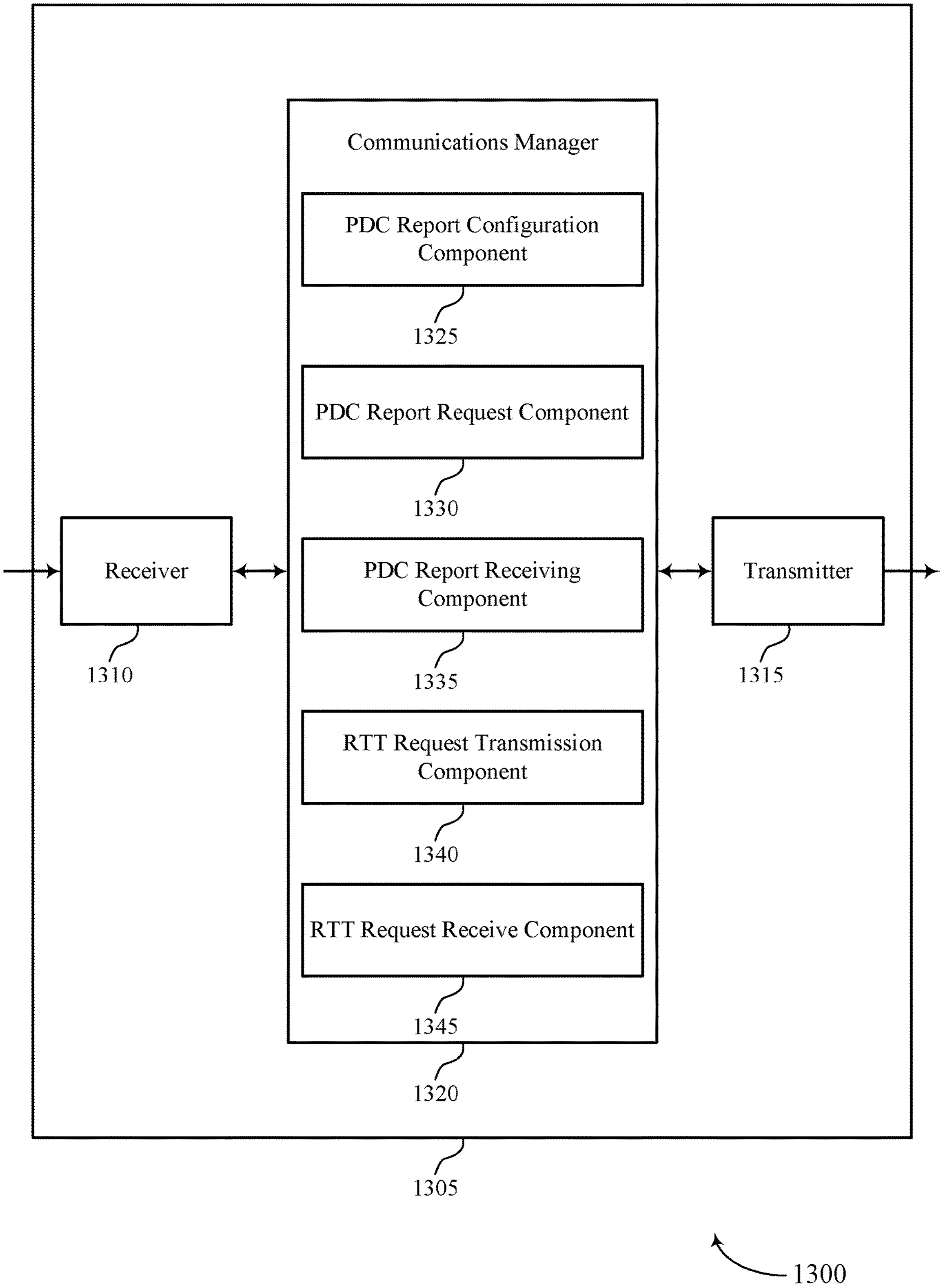

FIG. 13 shows a block diagram 1300 of a device 1305 that supports PDC enhancement in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to PDC enhancement). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to PDC enhancement). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of PDC enhancement as described herein. For example, the communications manager 1320 may include a PDC report configuration component 1325, a PDC report request component 1330, a PDC report receiving component 1335, an RTT request transmission component 1340, an RTT request receive component 1345, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. The PDC report configuration component 1325 may be configured as or otherwise support a means for transmitting, to a UE, an indication of a configuration for transmitting a PDC report and a reference signal resource for performing one or more round trip timing measurements associated with the PDC report. The PDC report request component 1330 may be configured as or otherwise support a means for transmitting, to the UE, control signaling including a request for the UE to transmit the PDC report including the one or more round trip timing measurements. The PDC report receiving component 1335 may be configured as or otherwise support a means for receiving, from the UE, the PDC report in accordance with the request.

Additionally or alternatively, the communications manager 1320 may support wireless communication at a base station in accordance with examples as disclosed herein. The RTT request transmission component 1340 may be configured as or otherwise support a means for transmitting, to a location management function, a request for round trip timing information associated with communications between the base station and a UE. The PDC report configuration component 1325 may be configured as or otherwise support a means for transmitting, to the UE, a reference signal configuration for performing a PDC procedure associated with the round trip timing information. The RTT request receive component 1345 may be configured as or otherwise support a means for receiving, from the location management function, the round trip timing information including one or more round trip timing measurements in accordance with the transmitted request. The PDC report receiving component 1335 may be configured as or otherwise support a means for transmitting, to the UE, PDC information based on the one or more round trip timing measurements.

Figure 14:
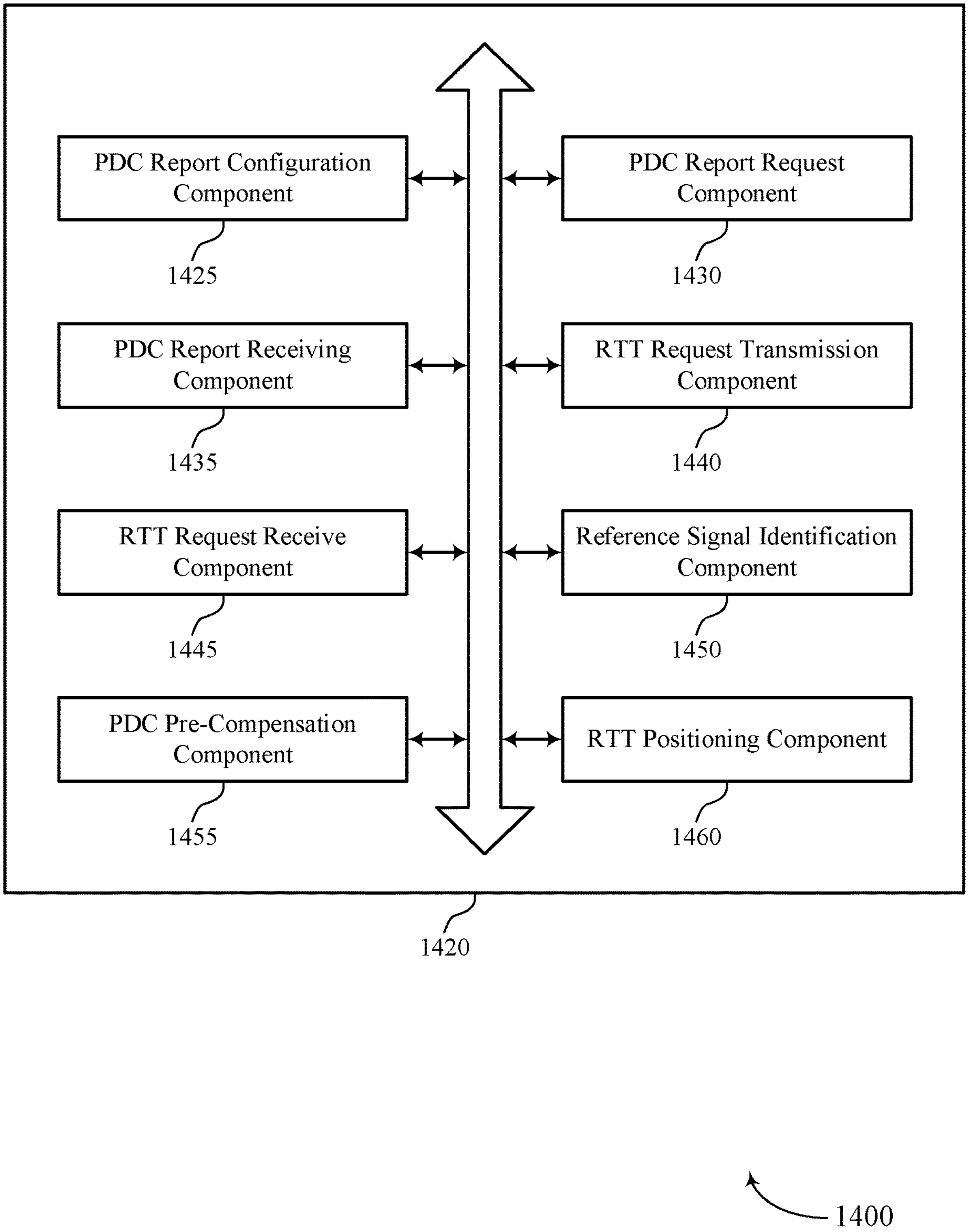
FIG. 14 shows a block diagram of a communications manager that supports PDC enhancement in accordance with aspects of the present disclosure.

FIG. 14 shows a block diagram 1400 of a communications manager 1420 that supports PDC enhancement in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of PDC enhancement as described herein. For example, the communications manager 1420 may include a PDC report configuration component 1425, a PDC report request component 1430, a PDC report receiving component 1435, an RTT request transmission component 1440, an RTT request receive component 1445, a reference signal identification component 1450, a PDC pre-compensation component 1455, an RTT positioning component 1460, or any combination thereof. Each of these components may communicate, directly or indirectly, with one another (e.g., via one or more buses).

The communications manager 1420 may support wireless communication at a base station in accordance with examples as disclosed herein. The PDC report configuration component 1425 may be configured as or otherwise support a means for transmitting, to a UE, an indication of a configuration for transmitting a PDC report and a reference signal resource for performing one or more round trip timing measurements associated with the PDC report. The PDC report request component 1430 may be configured as or otherwise support a means for transmitting, to the UE, control signaling including a request for the UE to transmit the PDC report including the one or more round trip timing measurements. The PDC report receiving component 1435 may be configured as or otherwise support a means for receiving, from the UE, the PDC report in accordance with the request.

In some examples, the control signaling includes DCI indicating an aperiodic reporting configuration for transmitting the PDC report, and the PDC report receiving component 1435 may be configured as or otherwise support a means for receiving, from the UE, one or more PDC reports in accordance with the aperiodic reporting configuration, and performing one or more PDC procedures based on the one or more RTT measurements.

In some examples, the control signaling includes DCI indicating an aperiodic reporting configuration for transmitting the PDC report, and the PDC report request component 1430 may be configured as or otherwise support a means for transmitting, in a first field of the DCI, a first indication of the request for the UE to transmit the PDC report. In some examples, the control signaling includes DCI indicating an aperiodic reporting configuration for transmitting the PDC report, and the PDC report request component 1430 may be configured as or otherwise support a means for transmitting, in a second field of the DCI, a second indication of the reference signal resource for performing the one or more round trip timing measurements associated with the PDC report.

In some examples, the reference signal resource indicates a bandwidth part on which the PDC report is to be transmitted.

In some examples, the first field of the DCI and the second field of the DCI each include a separate bitmap for conveying the first indication and the second indication.

In some examples, the control signaling includes DCI indicating an aperiodic reporting configuration for transmitting the PDC report, and the PDC report request component 1430 may be configured as or otherwise support a means for transmitting, in a single field of the DCI, the first indication of the request for the UE to transmit the PDC report and an indication of the reference signal resource for performing the one or more round trip timing measurements associated with the PDC report.

In some examples, the control signaling includes a MAC-CE indicating a semi-persistent reporting configuration for transmitting the PDC report, and the PDC report receiving component 1435 may be configured as or otherwise support a means for receiving, from the UE, one or more PDC reports in accordance with the semi-persistent reporting configuration.

In some examples, the control signaling includes a MAC-CE indicating a semi-persistent reporting configuration for transmitting the PDC report, and the PDC report configuration component 1425 may be configured as or otherwise support a means for transmitting, in a sub-header of the MAC-CE, a first indication of a downlink shared channel associated with an activation or deactivation of the semi-persistent reporting configuration for transmitting the PDC report.

In some examples, one or more fields of the sub-header indicate the activation or deactivation of the semi-persistent reporting configuration based on a positioning reference signal for the semi-persistent reporting.

In some examples, an additional one or more fields of the sub-header indicate the activation or deactivation of the semi-persistent reporting configuration and further indicate a channel status information reference signal for semi-persistent reporting of the PDC report.

In some examples, the control signaling includes DCI indicating a semi-persistent reporting configuration for transmitting the PDC report, and the PDC report receiving component 1435 may be configured as or otherwise support a means for receiving, from the UE, one or more PDC reports in accordance with the semi-persistent reporting configuration.

In some examples, the DCI is associated with a radio network temporary identifier indicating the semi-persistent reporting configuration in the DCI.

In some examples, one or more bitfield values of the DCI indicate an activation or deactivation of the semi-persistent reporting configuration for transmitting the PDC report.

In some examples, the indication of the configuration for transmitting the PDC report includes radio resource control signaling, and the reference signal identification component 1450 may be configured as or otherwise support a means for identifying the reference signal resource for performing the one or more round trip timing measurements based on the radio resource control signaling, the reference signal resource including a channel state information reference signal or a positioning reference signal.

In some examples, the radio resource control signaling includes respective configurations of both the PDC report and the reference signal resource.

In some examples, the radio resource control signaling includes a single configuration for transmission of the PDC report.

Additionally or alternatively, the communications manager 1420 may support wireless communication at a base station in accordance with examples as disclosed herein. The RTT request transmission component 1440 may be configured as or otherwise support a means for transmitting, to a location management function, a request for round trip timing information associated with communications between the base station and a UE. In some examples, the PDC report configuration component 1425 may be configured as or otherwise support a means for transmitting, to the UE, a reference signal configuration for performing a PDC procedure associated with the round trip timing information. The RTT request receive component 1445 may be configured as or otherwise support a means for receiving, from the location management function, the round trip timing information including one or more round trip timing measurements in accordance with the transmitted request. In some examples, the PDC report receiving component 1435 may be configured as or otherwise support a means for transmitting, to the UE, PDC information based on the one or more round trip timing measurements.

In some examples, the reference signal configuration for performing the PDC procedure includes a positioning reference signal configuration, a SRS configuration, or both.

In some examples, the PDC pre-compensation component 1455 may be configured as or otherwise support a means for performing one or more pre-compensation procedures for the UE based on the round trip timing information.

In some examples, the RTT positioning component 1460 may be configured as or otherwise support a means for performing, with the location management function and the UE, one or more round trip timing positioning procedures using position reference signaling, sounding reference signaling, or both, based on transmitting the request for the round trip timing information.

Figure 15:
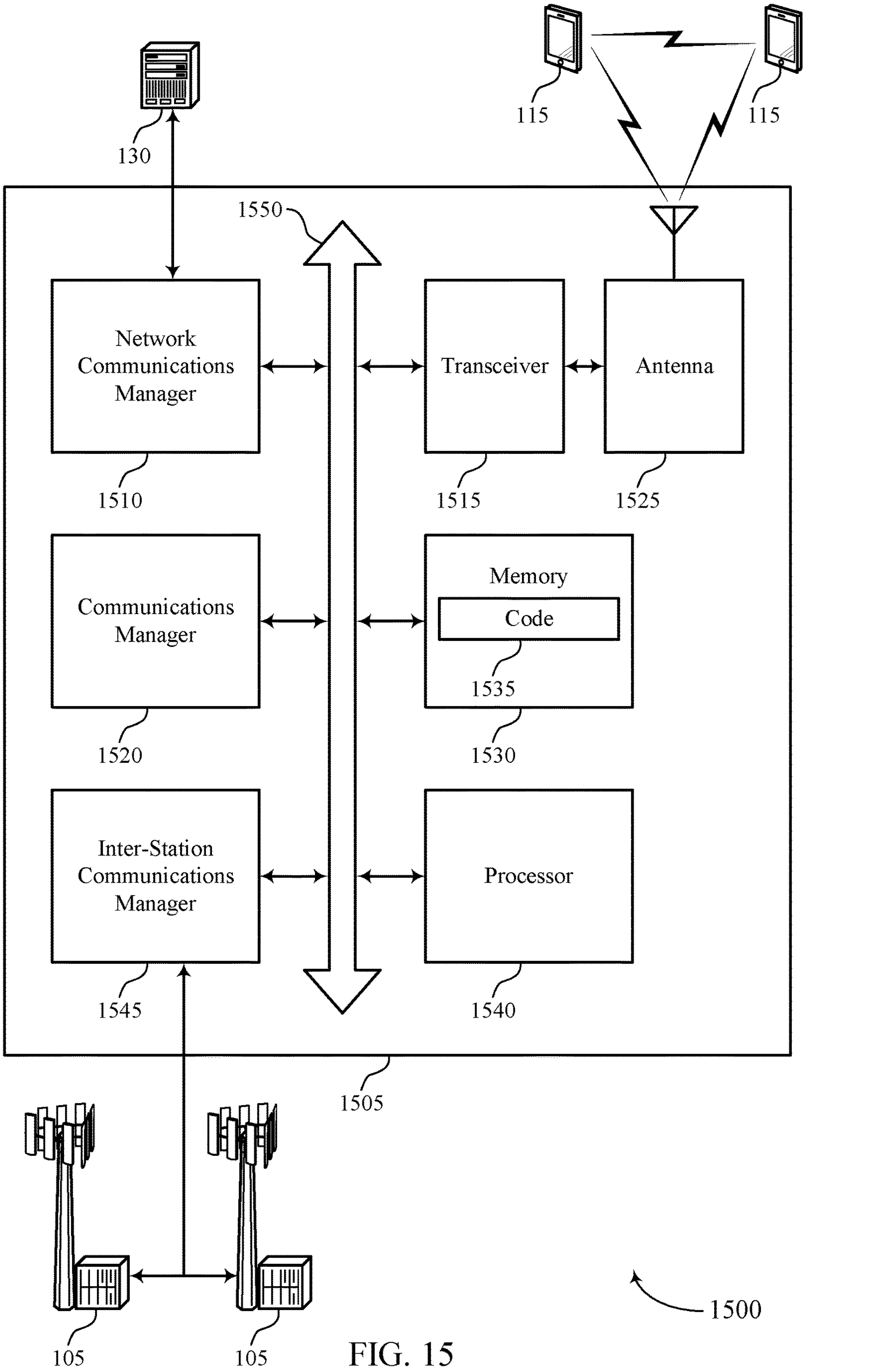
FIG. 15 shows a diagram of a system including a device that supports PDC enhancement in accordance with aspects of the present disclosure.

FIG. 15 shows a diagram of a system 1500 including a device 1505 that supports PDC enhancement in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting PDC enhancement). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communication at a base station in accordance with examples as disclosed herein. For example, the communications manager 1520 may be configured as or otherwise support a means for transmitting, to a UE, an indication of a configuration for transmitting a PDC report and a reference signal resource for performing one or more round trip timing measurements associated with the PDC report. The communications manager 1520 may be configured as or otherwise support a means for transmitting, to the UE, control signaling including a request for the UE to transmit the PDC report including the one or more round trip timing measurements. The communications manager 1520 may be configured as or otherwise support a means for receiving, from the UE, the PDC report in accordance with the request.

Additionally or alternatively, the communications manager 1520 may support wireless communication at a base station in accordance with examples as disclosed herein. For example, the communications manager 1520 may be configured as or otherwise support a means for transmitting, to a location management function, a request for round trip timing information associated with communications between the base station and a UE. The communications manager 1520 may be configured as or otherwise support a means for transmitting, to the UE, a reference signal configuration for performing a PDC procedure associated with the round trip timing information. The communications manager 1520 may be configured as or otherwise support a means for receiving, from the location management function, the round trip timing information including one or more round trip timing measurements in accordance with the transmitted request. The communications manager 1520 may be configured as or otherwise support a means for transmitting, to the UE, PDC information based on the one or more round trip timing measurements.

By including or configuring the communications manager 1520 in accordance with examples as described herein, the device 1505 may support techniques for improved communication reliability, reduced latency, improved user experience related to enhanced propagation delay management, more efficient utilization of communication resources, improved coordination between devices, increased signaling efficiency and device performance based on more accurate PDC.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of PDC enhancement as described herein, or the processor 1540 and the memory 1530 may be otherwise configured to perform or support such operations.

Figure 16:
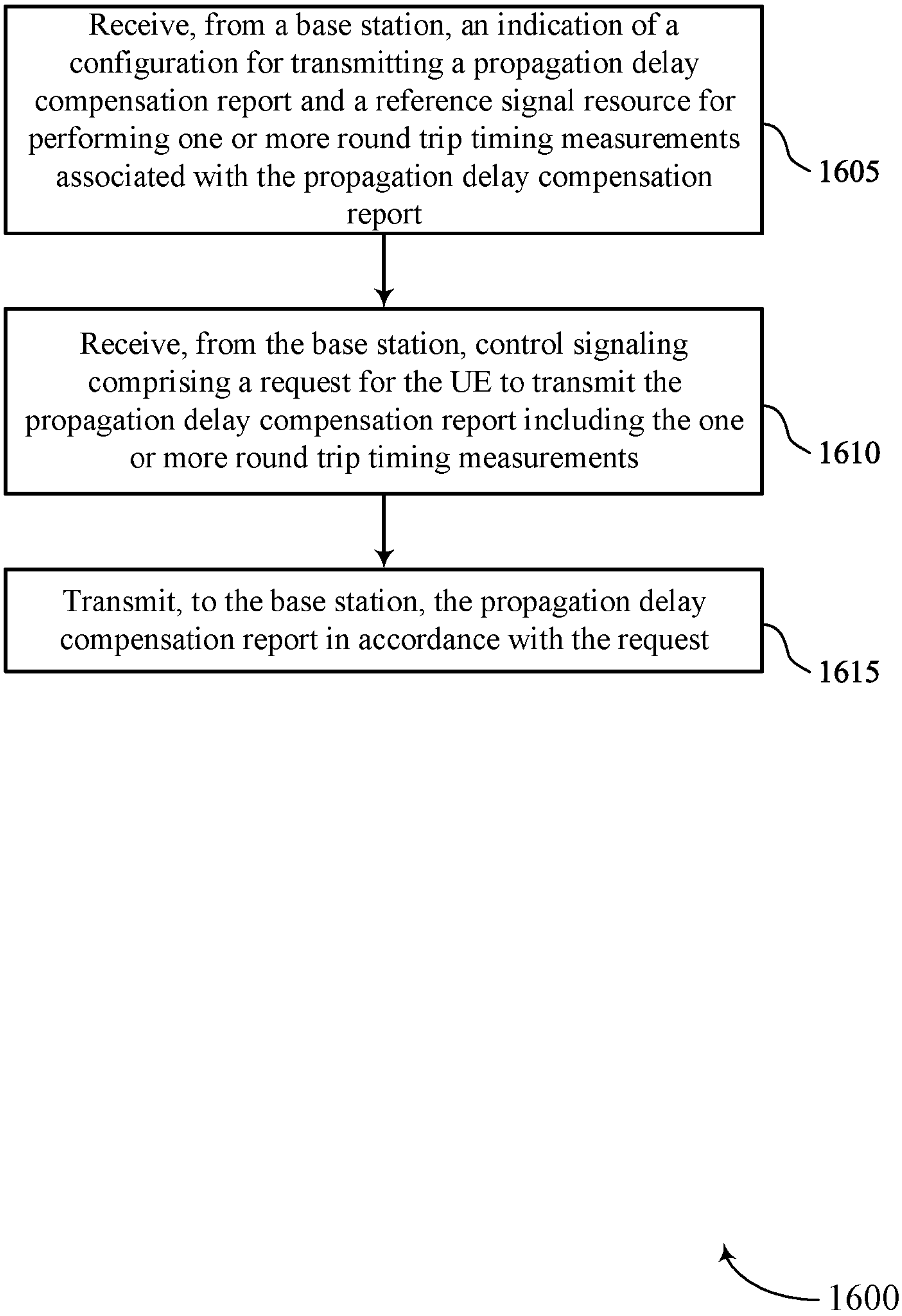
FIGS. 16 through 22 show flowcharts illustrating methods that support PDC enhancement in accordance with aspects of the present disclosure.

FIG. 16 shows a flowchart illustrating a method 1600 that supports PDC enhancement in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, an indication of a configuration for transmitting a PDC report and a reference signal resource for performing one or more round trip timing measurements associated with the PDC report. The operations of 1605 may be performed in accordance with examples as disclosed herein. In some examples, aspects of the operations of 1605 may be performed by a PDC report configuration component 1025 as described with reference to FIG. 10.

At 1610, the method may include receiving, from the base station, control signaling including a request for the UE to transmit the PDC report including the one or more round trip timing measurements. The operations of 1610 may be performed in accordance with examples as disclosed herein. In some examples, aspects of the operations of 1610 may be performed by a PDC report request component 1030 as described with reference to FIG. 10.

At 1615, the method may include transmitting, to the base station, the PDC report in accordance with the request. The operations of 1615 may be performed in accordance with examples as disclosed herein. In some examples, aspects of the operations of 1615 may be performed by a PDC report transmission component 1035 as described with reference to FIG. 10.

Figure 17:
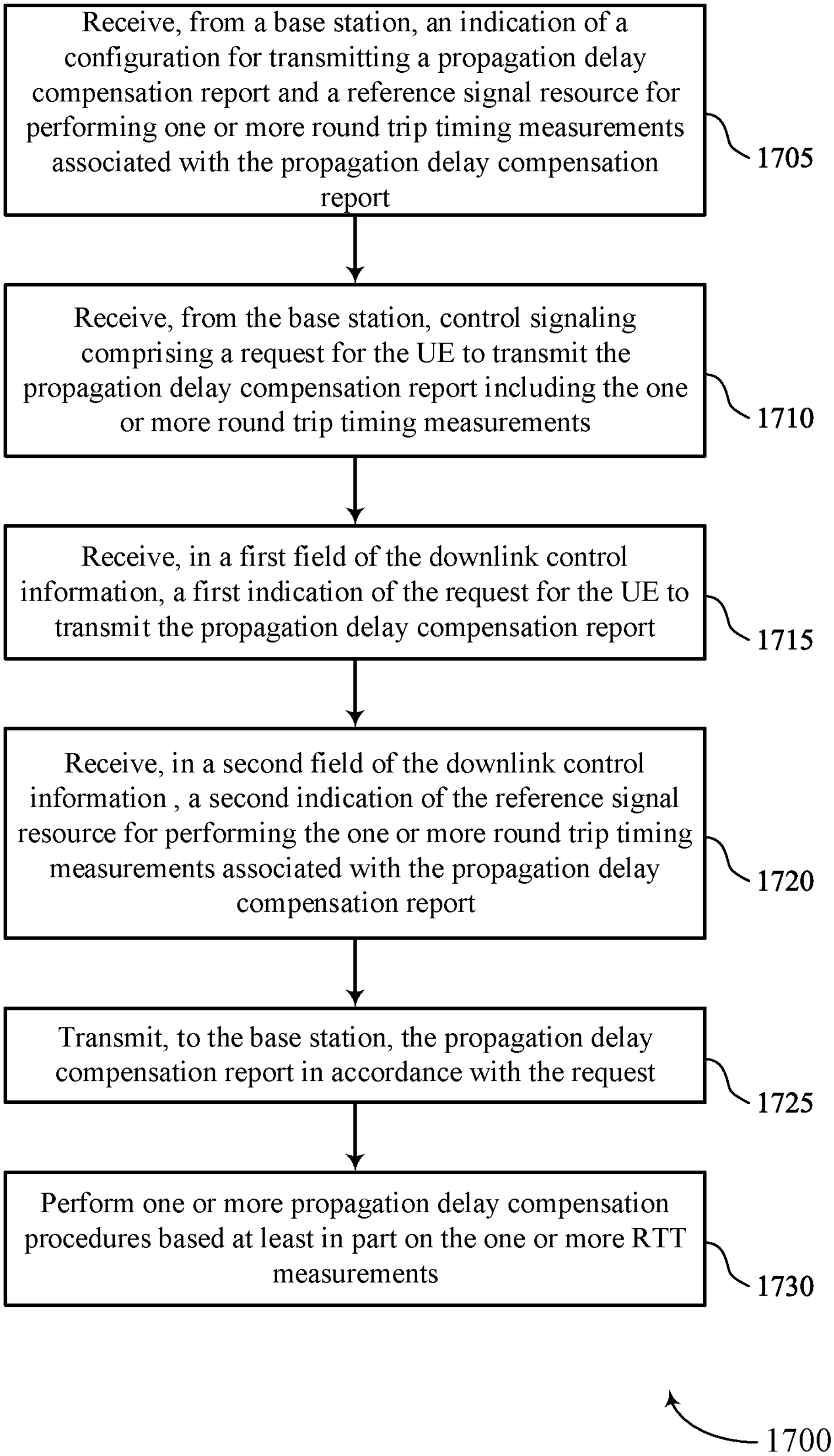

FIG. 17 shows a flowchart illustrating a method 1700 that supports PDC enhancement in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, an indication of a configuration for transmitting a PDC report and a reference signal resource for performing one or more round trip timing measurements associated with the PDC report. The operations of 1705 may be performed in accordance with examples as disclosed herein. In some examples, aspects of the operations of 1705 may be performed by a PDC report configuration component 1025 as described with reference to FIG. 10.

At 1710, the method may include receiving, from the base station, control signaling including a request for the UE to transmit the PDC report including the one or more round trip timing measurements. The operations of 1710 may be performed in accordance with examples as disclosed herein. In some examples, aspects of the operations of 1710 may be performed by a PDC report request component 1030 as described with reference to FIG. 10.

At 1715, the method may include receiving, in a first field of the DCI, a first indication of the request for the UE to transmit the PDC report. The operations of 1715 may be performed in accordance with examples as disclosed herein. In some examples, aspects of the operations of 1715 may be performed by a PDC report request component 1030 as described with reference to FIG. 10.

At 1720, the method may include receiving, in a second field of the DCI, a second indication of the reference signal resource for performing the one or more round trip timing measurements associated with the PDC report. The operations of 1720 may be performed in accordance with examples as disclosed herein. In some examples, aspects of the operations of 1720 may be performed by a PDC report request component 1030 as described with reference to FIG. 10.

At 1725, the method may include transmitting, to the base station, the PDC report in accordance with the request. The operations of 1725 may be performed in accordance with examples as disclosed herein. In some examples, aspects of the operations of 1725 may be performed by a PDC report transmission component 1035 as described with reference to FIG. 10.

At 1730, the method may include performing one or more PDC procedures based on the one or more RTT measurements. The operations of 1730 may be performed in accordance with examples as disclosed herein. In some examples, aspects of the operations of 1730 may be performed by a PDC implementation component 1040 as described with reference to FIG. 10.

Figure 18:
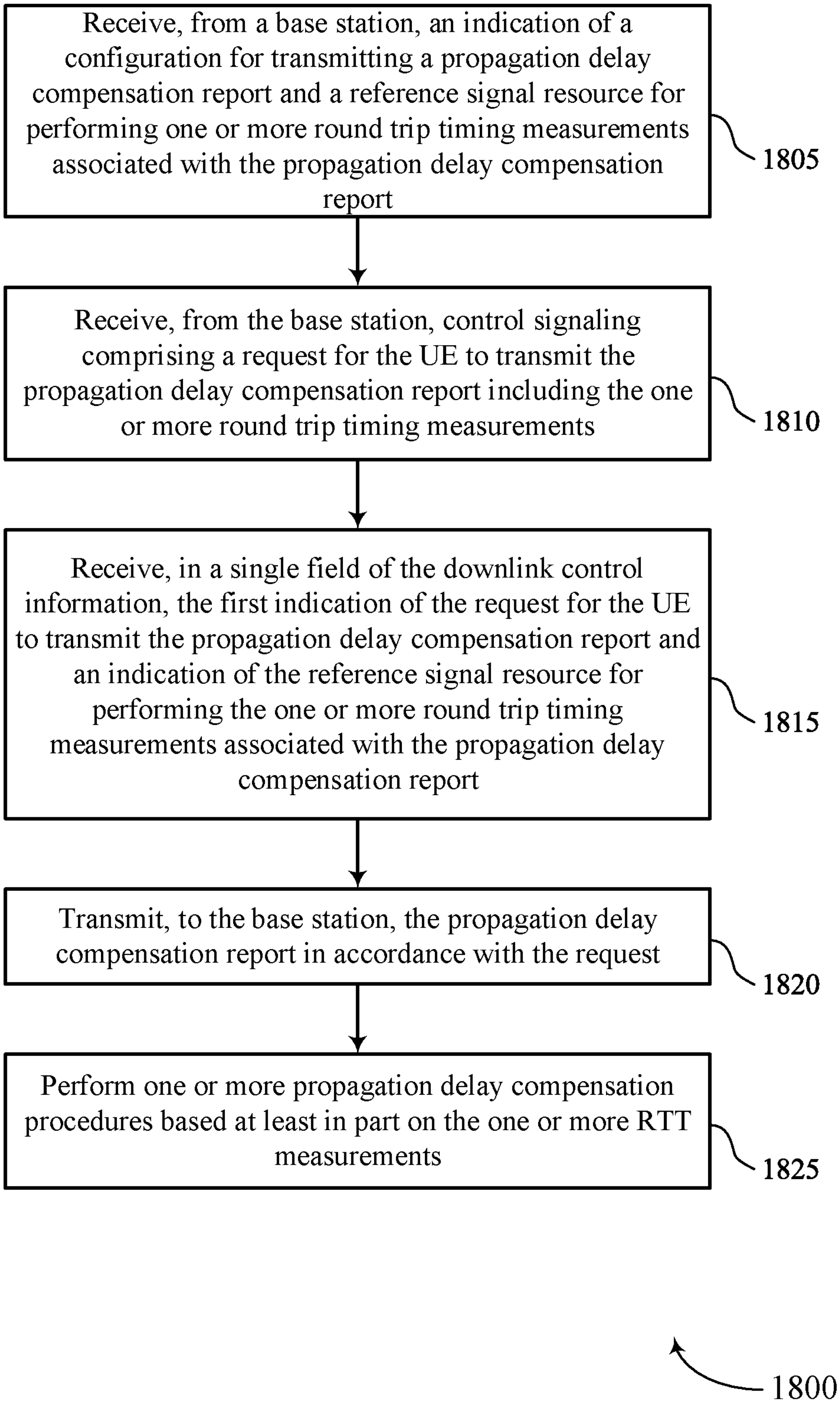

FIG. 18 shows a flowchart illustrating a method 1800 that supports PDC enhancement in accordance with aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1805, the method may include receiving, from a base station, an indication of a configuration for transmitting a PDC report and a reference signal resource for performing one or more round trip timing measurements associated with the PDC report. The operations of 1805 may be performed in accordance with examples as disclosed herein. In some examples, aspects of the operations of 1805 may be performed by a PDC report configuration component 1025 as described with reference to FIG. 10.

At 1810, the method may include receiving, from the base station, control signaling including a request for the UE to transmit the PDC report including the one or more round trip timing measurements. The operations of 1810 may be performed in accordance with examples as disclosed herein. In some examples, aspects of the operations of 1810 may be performed by a PDC report request component 1030 as described with reference to FIG. 10.

At 1815, the method may include receiving, in a single field of the DCI, the first indication of the request for the UE to transmit the PDC report and an indication of the reference signal resource for performing the one or more round trip timing measurements associated with the PDC report. The operations of 1815 may be performed in accordance with examples as disclosed herein. In some examples, aspects of the operations of 1815 may be performed by a PDC report request component 1030 as described with reference to FIG. 10.

At 1820, the method may include transmitting, to the base station, the PDC report in accordance with the request. The operations of 1820 may be performed in accordance with examples as disclosed herein. In some examples, aspects of the operations of 1820 may be performed by a PDC report transmission component 1035 as described with reference to FIG. 10.

At 1825, the method may include performing one or more PDC procedures based on the one or more RTT measurements. The operations of 1825 may be performed in accordance with examples as disclosed herein. In some examples, aspects of the operations of 1825 may be performed by a PDC implementation component 1040 as described with reference to FIG. 10.

Figure 19:
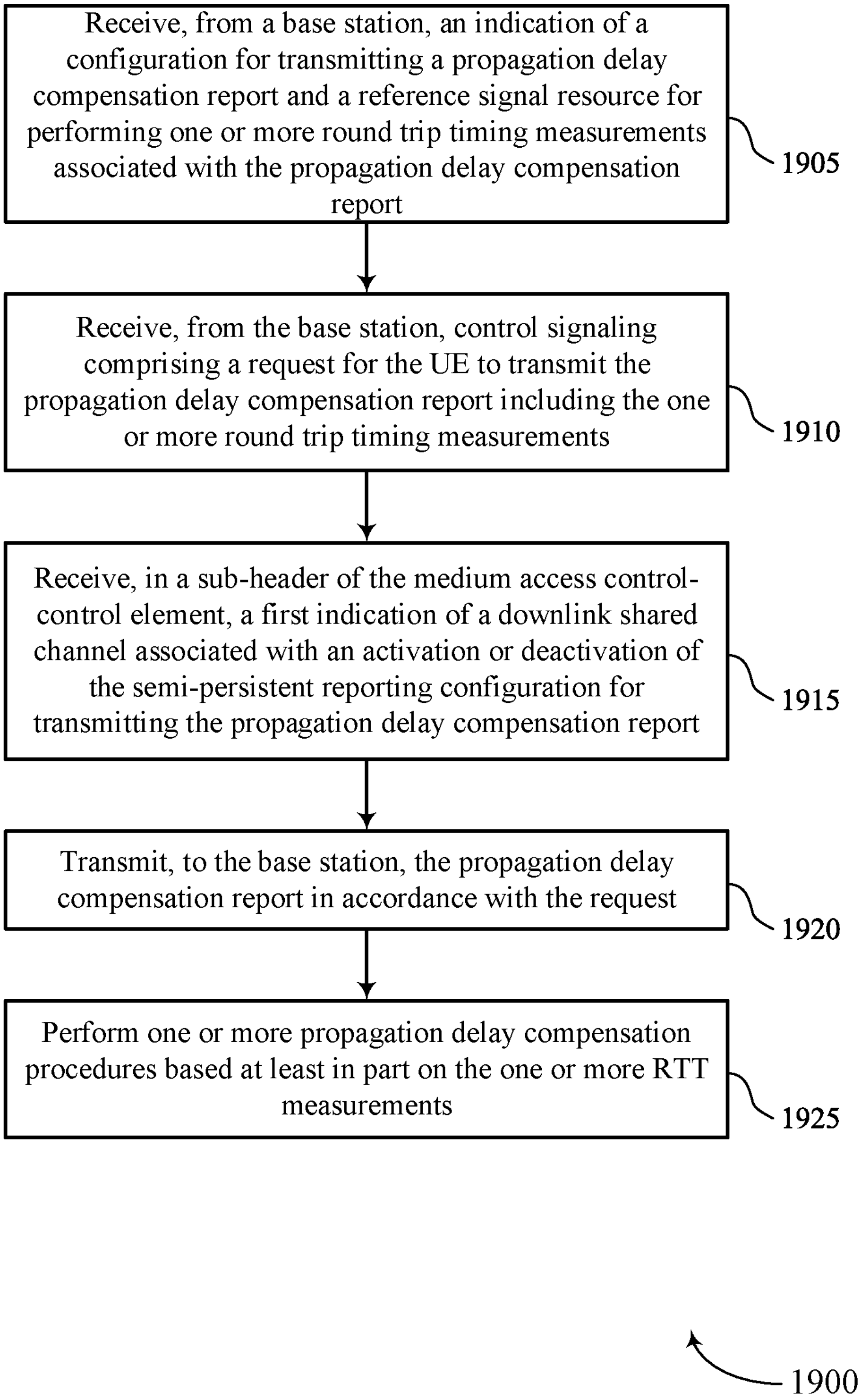

FIG. 19 shows a flowchart illustrating a method 1900 that supports PDC enhancement in accordance with aspects of the present disclosure. The operations of the method 1900 may be implemented by a UE or its components as described herein. For example, the operations of the method 1900 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1905, the method may include receiving, from a base station, an indication of a configuration for transmitting a PDC report and a reference signal resource for performing one or more round trip timing measurements associated with the PDC report. The operations of 1905 may be performed in accordance with examples as disclosed herein. In some examples, aspects of the operations of 1905 may be performed by a PDC report configuration component 1025 as described with reference to FIG. 10.

At 1910, the method may include receiving, from the base station, control signaling including a request for the UE to transmit the PDC report including the one or more round trip timing measurements. The operations of 1910 may be performed in accordance with examples as disclosed herein. In some examples, aspects of the operations of 1910 may be performed by a PDC report request component 1030 as described with reference to FIG. 10.

At 1915, the method may include receiving, in a sub-header of the MAC-CE, a first indication of a downlink shared channel associated with an activation or deactivation of the semi-persistent reporting configuration for transmitting the PDC report. The operations of 1915 may be performed in accordance with examples as disclosed herein. In some examples, aspects of the operations of 1915 may be performed by a PDC report configuration component 1025 as described with reference to FIG. 10.

At 1920, the method may include transmitting, to the base station, the PDC report in accordance with the request. The operations of 1920 may be performed in accordance with examples as disclosed herein. In some examples, aspects of the operations of 1920 may be performed by a PDC report transmission component 1035 as described with reference to FIG. 10.

At 1925, the method may include performing one or more PDC procedures based on the one or more RTT measurements. The operations of 1925 may be performed in accordance with examples as disclosed herein. In some examples, aspects of the operations of 1925 may be performed by a PDC implementation component 1040 as described with reference to FIG. 10.

Figure 20:
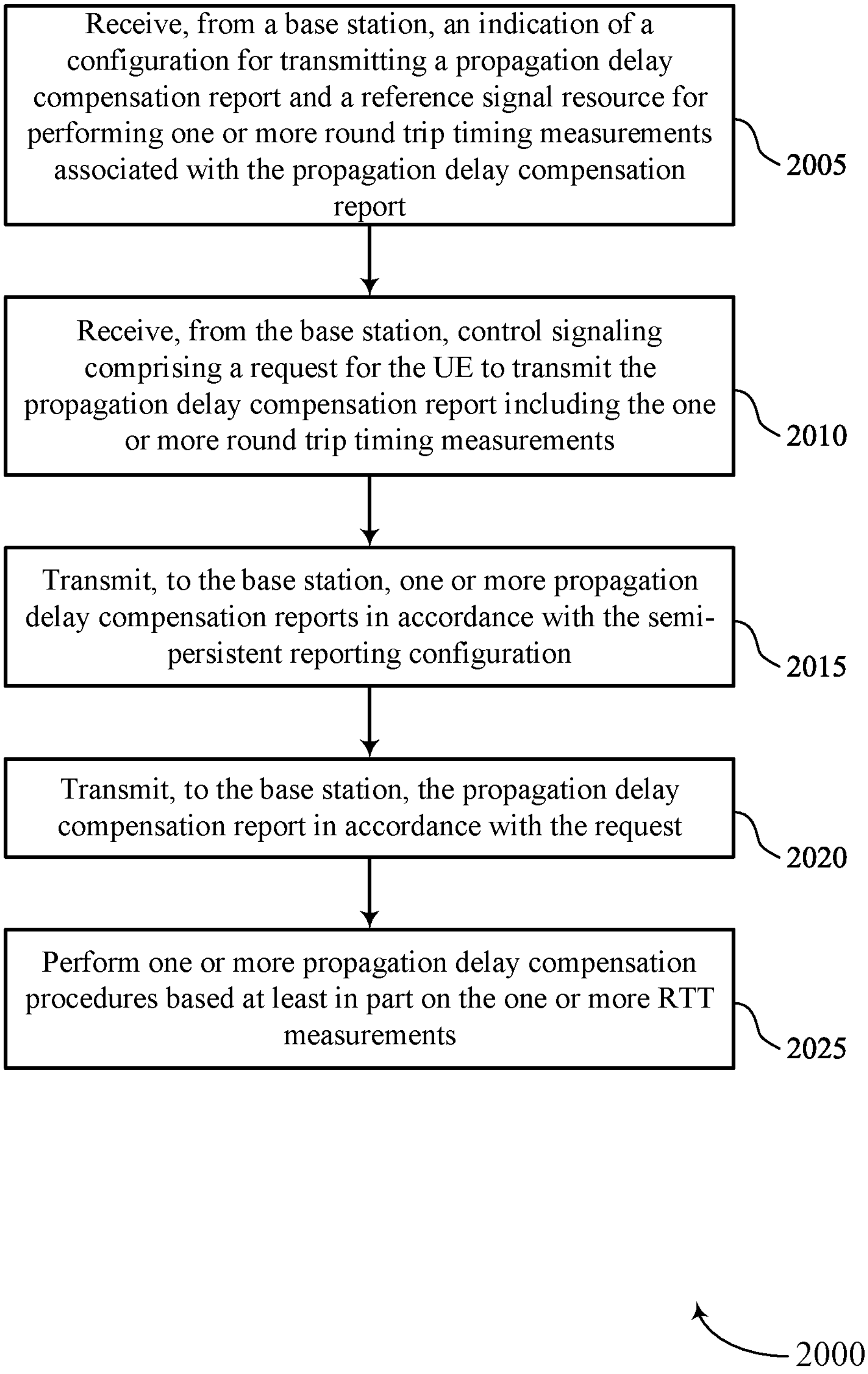

FIG. 20 shows a flowchart illustrating a method 2000 that supports PDC enhancement in accordance with aspects of the present disclosure. The operations of the method 2000 may be implemented by a UE or its components as described herein. For example, the operations of the method 2000 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 2005, the method may include receiving, from a base station, an indication of a configuration for transmitting a PDC report and a reference signal resource for performing one or more round trip timing measurements associated with the PDC report. The operations of 2005 may be performed in accordance with examples as disclosed herein. In some examples, aspects of the operations of 2005 may be performed by a PDC report configuration component 1025 as described with reference to FIG. 10.

At 2010, the method may include receiving, from the base station, control signaling including a request for the UE to transmit the PDC report including the one or more round trip timing measurements. The operations of 2010 may be performed in accordance with examples as disclosed herein. In some examples, aspects of the operations of 2010 may be performed by a PDC report request component 1030 as described with reference to FIG. 10.

At 2015, the method may include transmitting, to the base station, one or more PDC reports in accordance with the semi-persistent reporting configuration, and performing one or more PDC procedures based on the one or more RTT measurements. The operations of 2015 may be performed in accordance with examples as disclosed herein. In some examples, aspects of the operations of 2015 may be performed by a PDC report transmission component 1035 as described with reference to FIG. 10.

At 2020, the method may include transmitting, to the base station, the PDC report in accordance with the request. The operations of 2020 may be performed in accordance with examples as disclosed herein. In some examples, aspects of the operations of 2020 may be performed by a PDC report transmission component 1035 as described with reference to FIG. 10.

At 2025, the method may include performing one or more PDC procedures based on the one or more RTT measurements. The operations of 2025 may be performed in accordance with examples as disclosed herein. In some examples, aspects of the operations of 2025 may be performed by a PDC implementation component 1040 as described with reference to FIG. 10.

Figure 21:
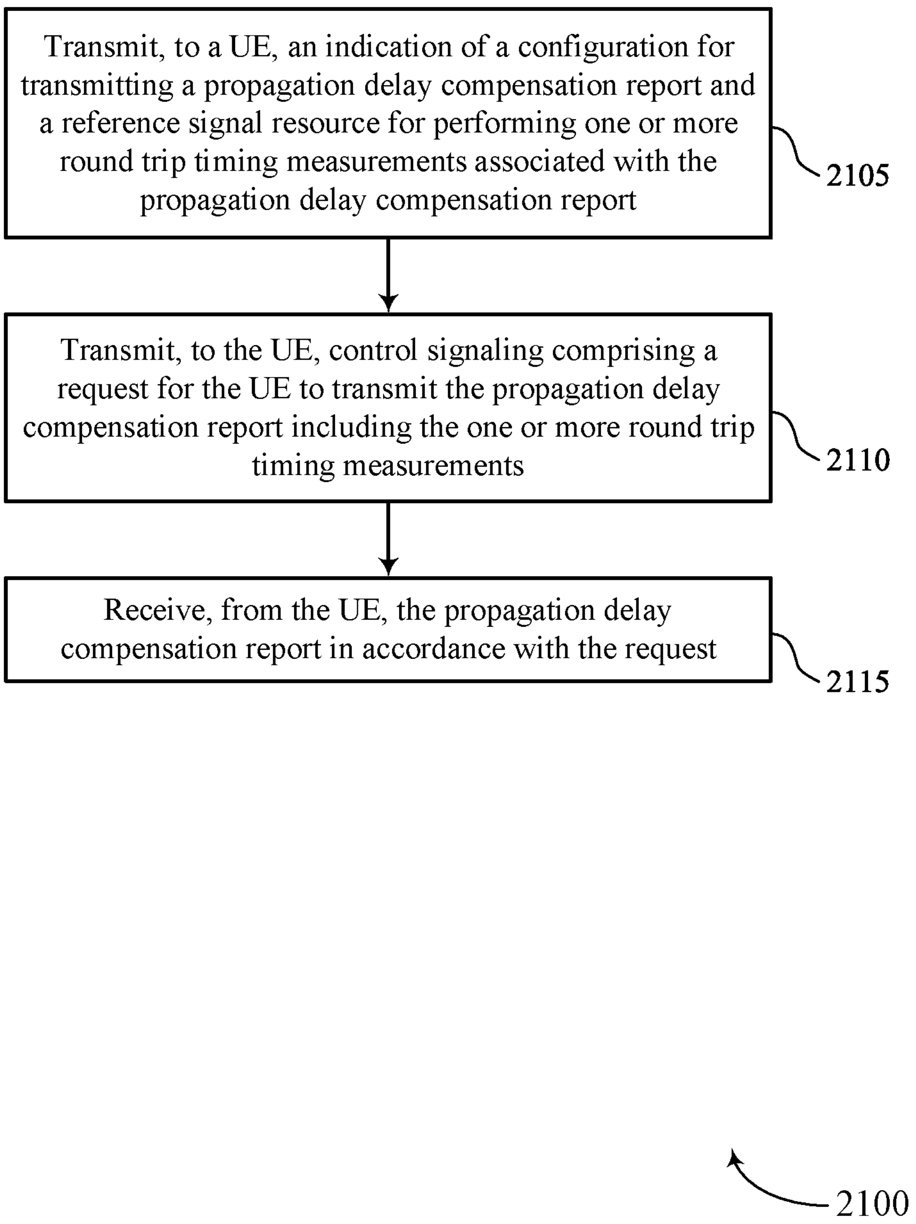

FIG. 21 shows a flowchart illustrating a method 2100 that supports PDC enhancement in accordance with aspects of the present disclosure. The operations of the method 2100 may be implemented by a base station or its components as described herein. For example, the operations of the method 2100 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 2105, the method may include transmitting, to a UE, an indication of a configuration for transmitting a PDC report and a reference signal resource for performing one or more round trip timing measurements associated with the PDC report. The operations of 2105 may be performed in accordance with examples as disclosed herein. In some examples, aspects of the operations of 2105 may be performed by a PDC report configuration component 1425 as described with reference to FIG. 14.

At 2110, the method may include transmitting, to the UE, control signaling including a request for the UE to transmit the PDC report including the one or more round trip timing measurements. The operations of 2110 may be performed in accordance with examples as disclosed herein. In some examples, aspects of the operations of 2110 may be performed by a PDC report request component 1430 as described with reference to FIG. 14.

At 2115, the method may include receiving, from the UE, the PDC report in accordance with the request. The operations of 2115 may be performed in accordance with examples as disclosed herein. In some examples, aspects of the operations of 2115 may be performed by a PDC report receiving component 1435 as described with reference to FIG. 14.

Figure 22:
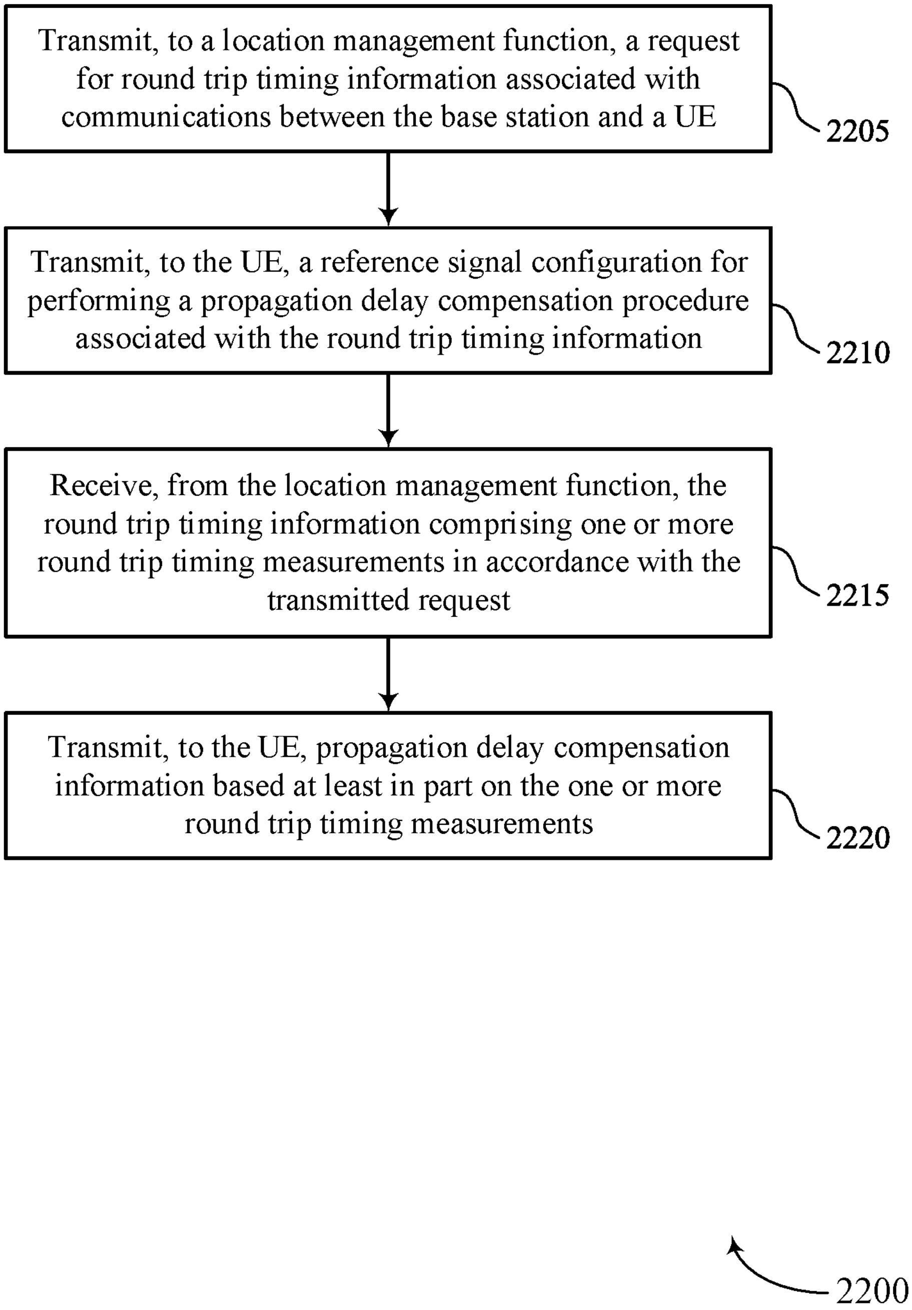

FIG. 22 shows a flowchart illustrating a method 2200 that supports PDC enhancement in accordance with aspects of the present disclosure. The operations of the method 2200 may be implemented by a base station or its components as described herein. For example, the operations of the method 2200 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 2205, the method may include transmitting, to a location management function, a request for round trip timing information associated with communications between the base station and a UE. The operations of 2205 may be performed in accordance with examples as disclosed herein. In some examples, aspects of the operations of 2205 may be performed by an RTT request transmission component 1440 as described with reference to FIG. 14.

At 2210, the method may include transmitting, to the UE, a reference signal configuration for performing a PDC procedure associated with the round trip timing information. The operations of 2210 may be performed in accordance with examples as disclosed herein. In some examples, aspects of the operations of 2210 may be performed by a PDC report configuration component 1425 as described with reference to FIG. 14.

At 2215, the method may include receiving, from the location management function, the round trip timing information including one or more round trip timing measurements in accordance with the transmitted request. The operations of 2215 may be performed in accordance with examples as disclosed herein. In some examples, aspects of the operations of 2215 may be performed by an RTT request receive component 1445 as described with reference to FIG. 14.

At 2220, the method may include transmitting, to the UE, PDC information based on the one or more round trip timing measurements. The operations of 2220 may be performed in accordance with examples as disclosed herein. In some examples, aspects of the operations of 2220 may be performed by a PDC report receiving component 1435 as described with reference to FIG. 14.

The following provides an overview of aspects of the present disclosure:

Aspect 1: A method for wireless communication at a UE, comprising: receiving, from a base station, an indication of a configuration for transmitting a PDC report and a reference signal resource for performing one or more RTT measurements associated with the PDC report; receiving, from the base station, control signaling comprising a request for the UE to transmit the PDC report including the one or more RTT measurements; and transmitting, to the base station, the PDC report in accordance with the request.

Aspect 2: The method of aspect 1, wherein the control signaling comprises DCI indicating an aperiodic reporting configuration for transmitting the PDC report, the method further comprising: transmitting, to the base station, one or more PDC reports in accordance with the aperiodic reporting configuration, and performing one or more PDC procedures based on the one or more RTT measurements.

Aspect 3: The method of any of aspects 1 through 2, wherein the control signaling comprises DCI indicating an aperiodic reporting configuration for transmitting the PDC report, the method further comprising: receiving, in a first field of the DCI, a first indication of the request for the UE to transmit the PDC report, and receiving, in a second field of the DCI, a second indication of the reference signal resource for performing the one or more RTT measurements associated with the PDC report.

Aspect 4: The method of aspect 3, wherein the reference signal resource indicates a bandwidth part on which the PDC report is to be transmitted.

Aspect 5: The method of any of aspects 3 through 4, wherein the first field of the DCI and the second field of the DCI each comprise a separate bitmap for conveying the first indication and the second indication.

Aspect 6: The method of any of aspects 1 through 5, wherein the control signaling comprises DCI indicating an aperiodic reporting configuration for transmitting the PDC report, the method further comprising: receiving, in a single field of the DCI, the first indication of the request for the UE to transmit the PDC report and an indication of the reference signal resource for performing the one or more RTT measurements associated with the PDC report.

Aspect 7: The method of any of aspects 1 through 6, wherein the control signaling comprises a MAC-CE indicating a semi-persistent reporting configuration for transmitting the PDC report, the method further comprising: transmitting, to the base station, one or more PDC reports in accordance with the semi-persistent reporting configuration, and performing one or more PDC procedures based on the one or more RTT measurements.

Aspect 8: The method of any of aspects 1 through 7, wherein the control signaling comprises a MAC-CE indicating a semi-persistent reporting configuration for transmitting the PDC report, the method further comprising: receiving, in a sub-header of the MAC-CE, a first indication of a downlink shared channel associated with an activation or deactivation of the semi-persistent reporting configuration for transmitting the PDC report.

Aspect 9: The method of aspect 8, wherein one or more fields of the sub-header indicate the activation or deactivation of the semi-persistent reporting configuration based at least in part on a PRS for the semi-persistent reporting.

Aspect 10: The method of any of aspects 8 through 9, wherein an additional one or more fields of the sub-header indicate the activation or deactivation of the semi-persistent reporting configuration and further indicate a channel status information reference signal for semi-persistent reporting of the PDC report.

Aspect 11: The method of any of aspects 1 through 10, wherein the control signaling comprises DCI indicating a semi-persistent reporting configuration for transmitting the PDC report, the method further comprising: transmitting, to the base station, one or more PDC reports in accordance with the semi-persistent reporting configuration, and performing one or more PDC procedures based on the one or more RTT measurements.

Aspect 12: The method of aspect 11, further comprising: receiving, in a first field of the DCI, a first indication of the request for the UE to transmit the PDC report, and receiving, in a second field of the DCI, a second indication of the reference signal resource for performing the one or more RTT measurements associated with the PDC report.

Aspect 13: The method of any of aspects 11 through 12, wherein the DCI is associated with a radio network temporary identifier indicating the semi-persistent reporting configuration in the DCI.

Aspect 14: The method of any of aspects 11 through 13, wherein one or more bitfield values of the DCI indicate an activation or deactivation of the semi-persistent reporting configuration for transmitting the PDC report.

Aspect 15: The method of any of aspects 1 through 14, wherein the indication of the configuration for transmitting the PDC report comprises RRC signaling, the method further comprising: identifying the reference signal resource for performing the one or more RTT measurements based at least in part on the RRC signaling, the reference signal resource comprising a CSI-RS or a PRS.

Aspect 16: The method of aspect 15, wherein the RRC signaling includes respective configurations of both the PDC report and the reference signal resource.

Aspect 17: The method of any of aspects 15 through 16, wherein the RRC signaling includes a single configuration for transmission of the PDC report.

Aspect 18: A method for wireless communication at a base station, comprising: transmitting, to a UE, an indication of a configuration for transmitting a PDC report and a reference signal resource for performing one or more RTT measurements associated with the PDC report; transmitting, to the UE, control signaling comprising a request for the UE to transmit the PDC report including the one or more RTT measurements; and receiving, from the UE, the PDC report in accordance with the request.

Aspect 19: The method of aspect 18, wherein the control signaling comprises DCI indicating an aperiodic reporting configuration for transmitting the PDC report, the method further comprising: receiving, from the UE, one or more PDC reports in accordance with the aperiodic reporting configuration.

Aspect 20: The method of any of aspects 18 through 19, wherein the control signaling comprises DCI indicating an aperiodic reporting configuration for transmitting the PDC report, the method further comprising: transmitting, in a first field of the DCI, a first indication of the request for the UE to transmit the PDC report, and transmitting, in a second field of the DCI, a second indication of the reference signal resource for performing the one or more RTT measurements associated with the PDC report.

Aspect 21: The method of aspect 20, wherein the reference signal resource indicates a bandwidth part on which the PDC report is to be transmitted.

Aspect 22: The method of any of aspects 20 through 21, wherein the first field of the DCI and the second field of the DCI each comprise a separate bitmap for conveying the first indication and the second indication.

Aspect 23: The method of any of aspects 18 through 22, wherein the control signaling comprises DCI indicating an aperiodic reporting configuration for transmitting the PDC report, the method further comprising: transmitting, in a single field of the DCI, the first indication of the request for the UE to transmit the PDC report and an indication of the reference signal resource for performing the one or more RTT measurements associated with the PDC report.

Aspect 24: The method of any of aspects 18 through 23, wherein the control signaling comprises a MAC-CE indicating a semi-persistent reporting configuration for transmitting the PDC report, the method further comprising: receiving, from the UE, one or more PDC reports in accordance with the semi-persistent reporting configuration.

Aspect 25: The method of any of aspects 18 through 24, wherein the control signaling comprises a MAC-CE indicating a semi-persistent reporting configuration for transmitting the PDC report, the method further comprising: transmitting, in a sub-header of the MAC-CE, a first indication of a downlink shared channel associated with an activation or deactivation of the semi-persistent reporting configuration for transmitting the PDC report.

Aspect 26: The method of aspect 25, wherein one or more fields of the sub-header indicate the activation or deactivation of the semi-persistent reporting configuration based at least in part on a PRS for the semi-persistent reporting.

Aspect 27: The method of any of aspects 25 through 26, wherein an additional one or more fields of the sub-header indicate the activation or deactivation of the semi-persistent reporting configuration and further indicate a channel status information reference signal for semi-persistent reporting of the PDC report.

Aspect 28: The method of any of aspects 18 through 27, wherein the control signaling comprises DCI indicating a semi-persistent reporting configuration for transmitting the PDC report, the method further comprising: receiving, from the UE, one or more PDC reports in accordance with the semi-persistent reporting configuration.

Aspect 29: The method of aspect 28, wherein the DCI is associated with a radio network temporary identifier indicating the semi-persistent reporting configuration in the DCI.

Aspect 30: The method of any of aspects 28 through 29, wherein one or more bitfield values of the DCI indicate an activation or deactivation of the semi-persistent reporting configuration for transmitting the PDC report.

Aspect 31: The method of any of aspects 18 through 30, wherein the indication of the configuration for transmitting the PDC report comprises RRC signaling, the method further comprising: identifying the reference signal resource for performing the one or more RTT measurements based at least in part on the RRC signaling, the reference signal resource comprising a CSI-RS or a PRS.

Aspect 32: The method of aspect 31, wherein the RRC signaling includes respective configurations of both the PDC report and the reference signal resource.

Aspect 33: The method of any of aspects 31 through 32, wherein the RRC signaling includes a single configuration for transmission of the PDC report.

Aspect 34: A method for wireless communication at a base station, comprising: transmitting, to a LMF, a request for RTT information associated with communications between the base station and a UE; transmitting, to the UE, a reference signal configuration for performing a PDC procedure associated with the RTT information; receiving, from the LMF, the RTT information comprising one or more RTT measurements in accordance with the transmitted request, and transmitting, to the UE, PDC information based at least in part on the one or more RTT measurements.

Aspect 35: The method of aspect 34, wherein the reference signal configuration for performing the PDC procedure comprises a PRS configuration, a SRS configuration, or both.

Aspect 36: The method of any of aspects 34 through 35, further comprising: performing one or more pre-compensation procedures for the UE based at least in part on the RTT information.

Aspect 37: The method of any of aspects 34 through 36, further comprising: performing, with the LMF and the UE, one or more RTT positioning procedures using position reference signaling, sounding reference signaling, or both, based at least in part on transmitting the request for the RTT information.

Aspect 38: An apparatus for wireless communication at a UE, comprising a processor; memory coupled with the processor; and instructions stored in the memory and executable by the processor to cause the apparatus to perform a method of any of aspects 1 through 17.

Aspect 39: An apparatus for wireless communication at a UE, comprising at least one means for performing a method of any of aspects 1 through 17.

Aspect 40: A non-transitory computer-readable medium storing code for wireless communication at a UE, the code comprising instructions executable by a processor to perform a method of any of aspects 1 through 17.

Aspect 41: An apparatus for wireless communication at a base station, comprising a processor; memory coupled with the processor; and instructions stored in the memory and executable by the processor to cause the apparatus to perform a method of any of aspects 18 through 33.

Aspect 42: An apparatus for wireless communication at a base station, comprising at least one means for performing a method of any of aspects 18 through 33.

Aspect 43: A non-transitory computer-readable medium storing code for wireless communication at a base station, the code comprising instructions executable by a processor to perform a method of any of aspects 18 through 33.

Aspect 44: An apparatus for wireless communication at a base station, comprising a processor; memory coupled with the processor; and instructions stored in the memory and executable by the processor to cause the apparatus to perform a method of any of aspects 34 through 37.

Aspect 45: An apparatus for wireless communication at a base station, comprising at least one means for performing a method of any of aspects 34 through 37.

Aspect 46: A non-transitory computer-readable medium storing code for wireless communication at a base station, the code comprising instructions executable by a processor to perform a method of any of aspects 34 through 37.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

The term "set," as used herein, includes the possibility of a set with one member. That is, the phrase "a set" shall be construed in the same manner as "one or more."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
- one or more processors; and
- one or more memories coupled with the one or more processors and storing instructions executable by the one or more processors to cause the UE to:
  - receive, from a network device, an indication of a configuration for transmitting a propagation delay compensation report and a reference signal resource for performing one or more round trip timing measurements associated with the propagation delay compensation report;
  - receive, from the network device, control signaling comprising a request for the UE to transmit the propagation delay compensation report including the one or more round trip timing measurements, wherein the control signaling comprises downlink control information indicating an aperiodic reporting configuration or a semi-persistent reporting configuration for transmitting the propagation delay compensation report, and wherein a first indication of the request for the UE to transmit the propagation delay compensation report and a second indication of the reference signal resource are received in a first field and a second field of the downlink control information, respectively, or in a single field of the downlink control information; and
  - transmit, to the network device, the propagation delay compensation report in accordance with the request.

2. The UE of claim 1, wherein the control signaling comprises the downlink control information indicating the aperiodic reporting configuration for transmitting the propagation delay compensation report, and the instructions are further executable by the one or more processors to cause the UE to:
- transmit, to the network device, one or more propagation delay compensation reports in accordance with the aperiodic reporting configuration; and
- perform one or more propagation delay compensation procedures based at least in part on the one or more round trip timing measurements.

3. The UE of claim 1, wherein the reference signal resource indicates a bandwidth part on which the propagation delay compensation report is to be transmitted.

4. The UE of claim 1, wherein the first field of the downlink control information and the second field of the downlink control information each comprise a separate bitmap for conveying the first indication and the second indication.

5. The UE of claim 1, wherein the control signaling comprises a medium access control-control element indicating the semi-persistent reporting configuration for transmitting the propagation delay compensation report, and the instructions are further executable by the one or more processors to cause the UE to:

transmit, to the network device, one or more propagation delay compensation reports in accordance with the semi-persistent reporting configuration; and perform one or more propagation delay compensation procedures based at least in part on the one or more round trip timing measurements.

6. The UE of claim 1, wherein the control signaling comprises a medium access control-control element indicating the semi-persistent reporting configuration for transmitting the propagation delay compensation report, and the instructions are further executable by the one or more processors to cause the UE to:

receive, in a sub-header of the medium access control-control element, a third indication of a downlink shared channel associated with an activation or deactivation of the semi-persistent reporting configuration for transmitting the propagation delay compensation report.

7. The UE of claim 6, wherein one or more fields of the sub-header indicate the activation or deactivation of the semi-persistent reporting configuration based at least in part on a positioning reference signal for the semi-persistent reporting configuration.

8. The UE of claim 6, wherein an additional one or more fields of the sub-header indicate the activation or deactivation of the semi-persistent reporting configuration and further indicate a channel status information reference signal for semi-persistent reporting of the propagation delay compensation report.

9. The UE of claim 1, wherein the control signaling comprises the downlink control information indicating the semi-persistent reporting configuration for transmitting the propagation delay compensation report, and the instructions are further executable by the one or more processors to cause the UE to:

transmit, to the network device, one or more propagation delay compensation reports in accordance with the semi-persistent reporting configuration; and perform one or more propagation delay compensation procedures based at least in part on the one or more round trip timing measurements.

10. The UE of claim 9, wherein the downlink control information is associated with a radio network temporary identifier indicating the semi-persistent reporting configuration in the downlink control information.

11. The UE of claim 9, wherein one or more bitfield values of the downlink control information indicate an activation or deactivation of the semi-persistent reporting configuration for transmitting the propagation delay compensation report.

12. The UE of claim 1, wherein the indication of the configuration for transmitting the propagation delay compensation report comprises radio resource control signaling, and the instructions are further executable by the one or more processors to cause the UE to:

identify the reference signal resource for performing the one or more round trip timing measurements based at least in part on the radio resource control signaling, the reference signal resource comprising a channel state information reference signal or a positioning reference signal.

13. The UE of claim 12, wherein the radio resource control signaling includes respective configurations of both the propagation delay compensation report and the reference signal resource.

14. The UE of claim 12, wherein the radio resource control signaling includes a single configuration for transmission of the propagation delay compensation report.

15. An A network device for wireless communication, comprising:

one or more processors; and one or more memories coupled with the one or more processors and storing instructions executable by the one or more processors to cause the network device to:

transmit, to a user equipment (UE), an indication of a configuration for transmitting a propagation delay compensation report and a reference signal resource for performing one or more round trip timing measurements associated with the propagation delay compensation report;

transmit, to the UE, control signaling comprising a request for the UE to transmit the propagation delay compensation report including the one or more round trip timing measurements, wherein the control signaling comprises downlink control information indicating an aperiodic reporting configuration or a semi-persistent reporting configuration for transmitting the propagation delay compensation report, and wherein a first indication of the request for the UE to transmit the propagation delay compensation report and a second indication of the reference signal resource are transmitted in a first field and a second field of the downlink control information, respectively, or in a single field of the downlink control information; and receive, from the UE, the propagation delay compensation report in accordance with the request.

16. The network device of claim 15, wherein the control signaling comprises the downlink control information indicating the aperiodic reporting configuration for transmitting the propagation delay compensation report, and the instructions are further executable by the one or more processors to cause the network device to:

receive, from the UE, one or more propagation delay compensation reports in accordance with the aperiodic reporting configuration.

17. The network device of claim 15, wherein the control signaling comprises a medium access control-control element indicating the semi-persistent reporting configuration for transmitting the propagation delay compensation report, and the instructions are further executable by the one or more processors to cause the network device to:

transmit, in a sub-header of the medium access control-control element, a third indication of a downlink shared channel associated with an activation or deactivation of the semi-persistent reporting configuration for transmitting the propagation delay compensation report.

18. The network device of claim 15, wherein the control signaling comprises the downlink control information indicating the semi-persistent reporting configuration for transmitting the propagation delay compensation report, and the instructions are further executable by the one or more processors to cause the network device to:

receive, from the UE, one or more propagation delay compensation reports in accordance with the semi-persistent reporting configuration.

19. The network device of claim 15, wherein the indication of the configuration for transmitting the propagation delay compensation report comprises radio resource control signaling, and the instructions are further executable by the one or more processors to cause the network device to:

identify the reference signal resource for performing the one or more round trip timing measurements based at least in part on the radio resource control signaling, the reference signal resource comprising a channel state information reference signal or a positioning reference signal.

20. The network device of claim 19, wherein the radio resource control signaling includes respective configurations of both the propagation delay compensation report and the reference signal resource or a single configuration for transmission of the propagation delay compensation report.

21. A network device for wireless communication, comprising:

one or more processors; and one or more memories coupled with the one or more processors and storing instructions executable by the one or more processors to cause the network device to:

transmit, to a location management function, a request for round trip timing information associated with communications between the network device and a user equipment (UE);

transmit, to the UE, a reference signal configuration for performing a propagation delay compensation procedure associated with the round trip timing information;

receive, from the location management function, the round trip timing information comprising one or more round trip timing measurements in accordance with the transmitted request, and transmit, to the UE, propagation delay compensation information based at least in part on the one or more round trip timing measurements.

22. The network device of claim 21, wherein the reference signal configuration for performing the propagation delay compensation procedure comprises a positioning reference signal configuration, a sounding reference signal configuration, or both.

23. The network device of claim 21, wherein the instructions are further executable by the one or more processors to cause the network device to:

perform one or more pre-compensation procedures for the UE based at least in part on the round trip timing information.

24. The network device of claim 21, wherein the instructions are further executable by the one or more processors to cause the network device to:

perform, with the location management function and the UE, one or more round trip timing positioning procedures using position reference signaling, sounding reference signaling, or both, based at least in part on transmitting the request for the round trip timing information.

25. A method for wireless communication at a user equipment (UE), comprising:

receiving, from a network device, an indication of a configuration for transmitting a propagation delay compensation report and a reference signal resource for performing one or more round trip timing measurements associated with the propagation delay compensation report;

receiving, from the network device, control signaling comprising a request for the UE to transmit the propagation delay compensation report including the one or more round trip timing measurements, wherein the control signaling comprises downlink control information indicating an aperiodic reporting configuration or a semi-persistent reporting configuration for transmitting the propagation delay compensation report, and wherein a first indication of the request for the UE to transmit the propagation delay compensation report and a second indication of the reference signal resource are received in a first field and a second field of the downlink control information, respectively, or in a single field of the downlink control information; and transmitting, to the network device, the propagation delay compensation report in accordance with the request.

* * * * *